(12) United States Patent
Skidmore

(10) Patent No.: US 11,324,288 B2
(45) Date of Patent: May 10, 2022

(54) OCCUPANT RESTRAINT ADJUSTMENT AND FASTENING APPARATUS

(71) Applicant: CARE4FUTURES LTD, Belbroughton (GB)

(72) Inventor: Alison Skidmore, Stourbridge (GB)

(73) Assignee: CARE4FUTURES LTD, Belbroughton (GB)

( * ) Notice: Subject to any disclaimer, the term of this patent is extended or adjusted under 35 U.S.C. 154(b) by 0 days.

(21) Appl. No.: 16/643,570

(22) PCT Filed: Aug. 29, 2018

(86) PCT No.: PCT/GB2018/052433
§ 371 (c)(1),
(2) Date: Mar. 1, 2020

(87) PCT Pub. No.: WO2019/043376
PCT Pub. Date: Mar. 7, 2019

(65) Prior Publication Data
US 2020/0196712 A1 Jun. 25, 2020

(30) Foreign Application Priority Data

Sep. 1, 2017 (GB) .................................. 1714028

(51) Int. Cl.
*B60R 22/10* (2006.01)
*B60R 22/30* (2006.01)
(Continued)

(52) U.S. Cl.
CPC ........ *A44B 11/2557* (2013.01); *B60N 2/2812* (2013.01); *B60R 22/105* (2013.01); *B60R 22/30* (2013.01); *B62B 9/24* (2013.01)

(58) Field of Classification Search
CPC ..... B60R 22/105; B60R 22/30; B60N 2/2812; B60N 2/265; B60N 2002/2815; A44B 11/25; A44B 11/2503; A44B 11/2507; A44B 11/2511; A44B 11/2542; A44B 11/2557; B62B 9/24
See application file for complete search history.

(56) References Cited

U.S. PATENT DOCUMENTS 4,656,700 A * 4/1987 Tanaka .................... B64D 17/38
24/579.11
8,177,303 B2 * 5/2012 Chen ........................ B60R 22/20
297/484
(Continued)

FOREIGN PATENT DOCUMENTS

AU 7237500 A1 6/2001
CN 107985490 A * 5/2018
(Continued)

OTHER PUBLICATIONS

IPO, Search Report for GB1714028.6, dated Feb. 26, 2018.
WIPO, ISR for PCT/GB2018/052433, Dec. 10, 2018.

*Primary Examiner* — Ryan D Kwiecinski
(74) *Attorney, Agent, or Firm* — Hodgson Russ LLP

(57) ABSTRACT

A restrain adjustment mechanism (100) has a buckle (122) with a rotatable dial (302) which is connected by a gear to a pair of strap adjusters (118, 120). Rotation of the dial 302 adjusts the straps (102, 104). The adjusters (118, 120) are removably mounted to the buckle (122).

18 Claims, 20 Drawing Sheets

(51) Int. Cl.
*B60N 2/28* (2006.01)
*A44B 11/25* (2006.01)
*B62B 9/24* (2006.01)

(56) References Cited

U.S. PATENT DOCUMENTS

| | | | |
|---|---|---|---|
| 10,974,690 B2 * | 4/2021 | Woellert | B60N 2/28 |
| 2005/0225157 A1 * | 10/2005 | Patrizi | B60N 2/2812 |
| | | | 297/464 |
| 2010/0109215 A1 * | 5/2010 | Ruthinowski | B60N 2/2887 |
| | | | 267/140.13 |
| 2010/0109216 A1 * | 5/2010 | Ruthinowski | F16F 7/00 |
| | | | 267/140.13 |
| 2012/0104815 A1 * | 5/2012 | Miller | A44B 11/2526 |
| | | | 297/250.1 |
| 2018/0271224 A1 * | 9/2018 | Huang | A44B 11/2542 |
| 2019/0193673 A1 * | 6/2019 | Williams | B60R 22/28 |
| 2020/0196712 A1 * | 6/2020 | Skidmore | A44B 11/2557 |

FOREIGN PATENT DOCUMENTS

| | | | | |
|---|---|---|---|---|
| CN | 112092767 A | * | 12/2020 | |
| DE | 4105725 C1 | * | 5/1992 | ............. B65D 63/00 |
| DE | 4105725 C1 | | 5/1992 | |
| DE | 102018123026 A1 | * | 3/2020 | ......... A44B 11/2588 |
| EP | 0295838 A1 | | 12/1988 | |
| NL | 9500024 A | * | 8/1996 | ........... B60R 22/347 |
| NL | 9500024 A | | 8/1996 | |
| WO | WO-2007030865 A1 | * | 3/2007 | ............... B62B 9/24 |
| WO | WO-2012037398 A2 | * | 3/2012 | ......... A44B 11/2526 |
| WO | 2016200807 A1 | | 12/2016 | |
| WO | WO-2016200807 A1 | * | 12/2016 | ......... A44B 11/2592 |
| WO | WO-2019043376 A1 | * | 3/2019 | ........... B60R 22/105 |

* cited by examiner

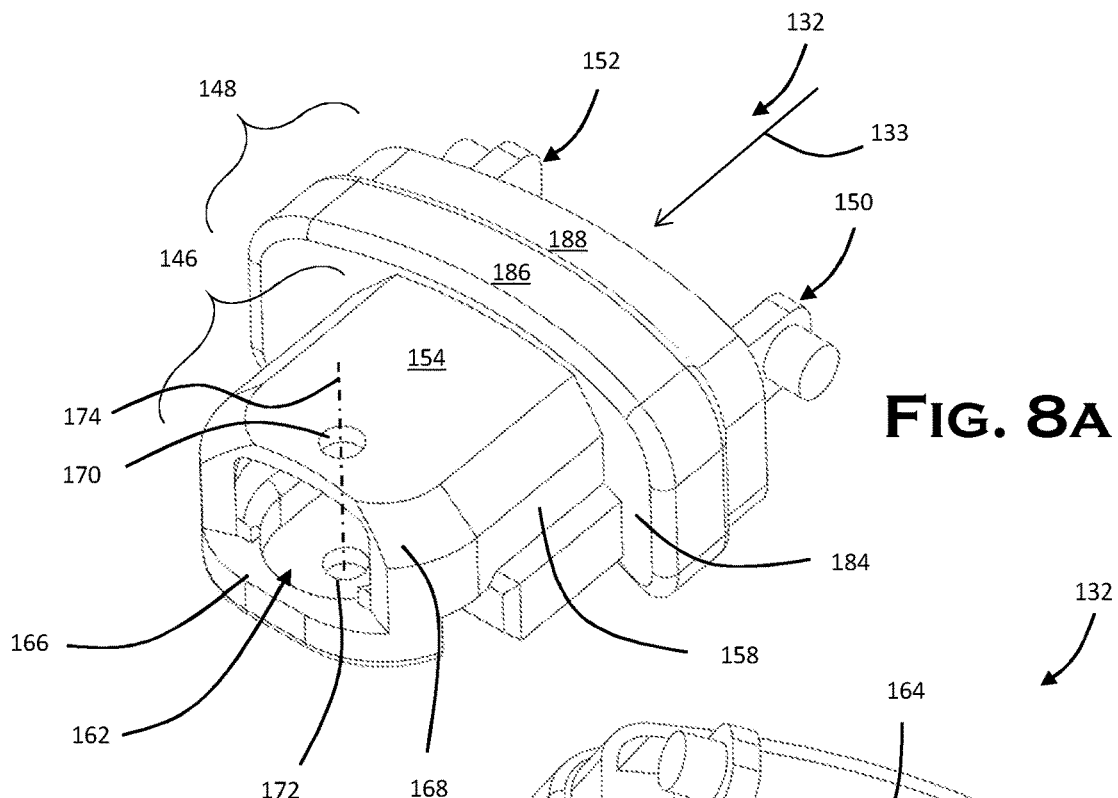
FIG. 8A
FIG. 8B
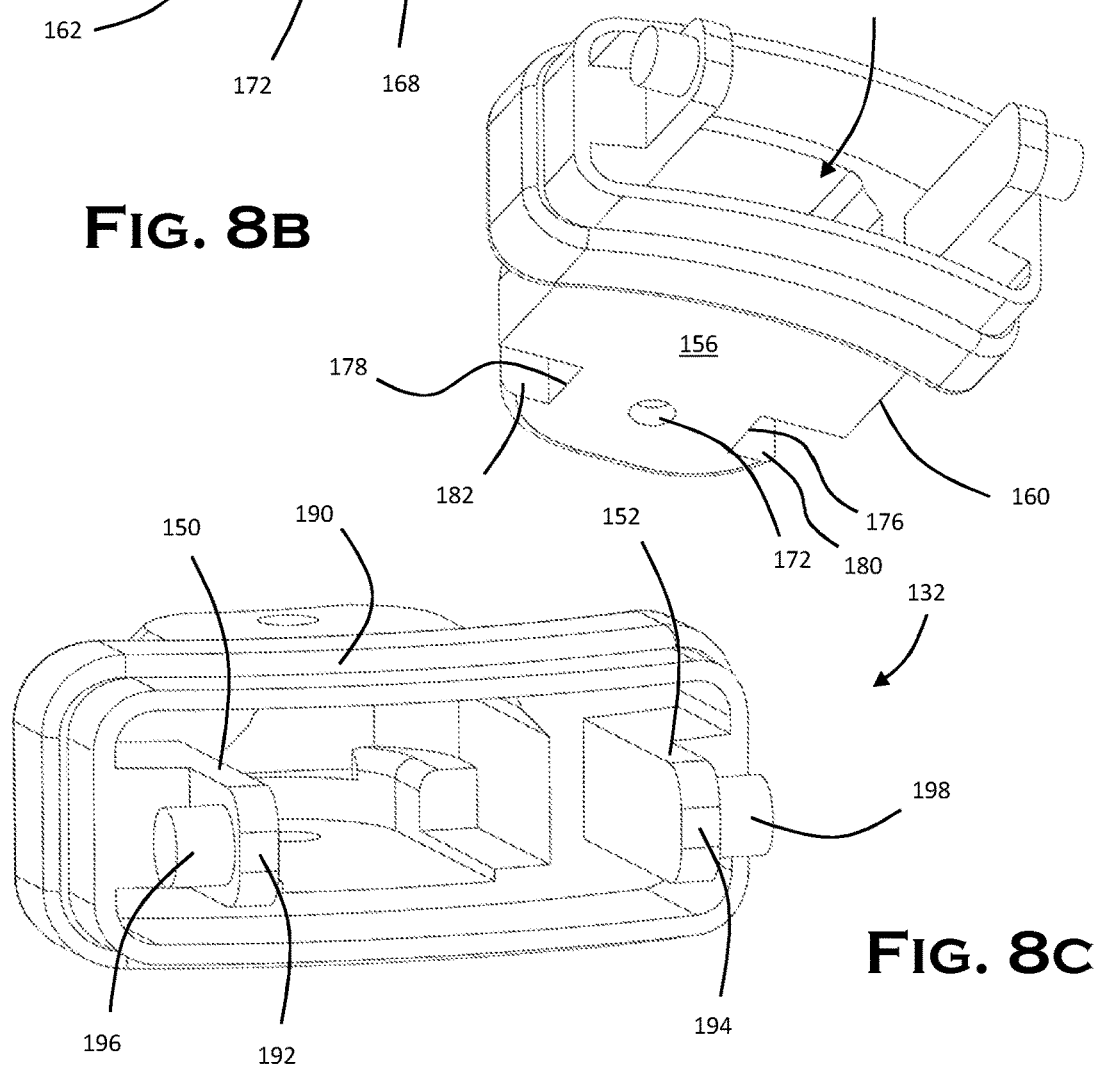
FIG. 8C

OCCUPANT RESTRAINT ADJUSTMENT AND FASTENING APPARATUS

The present invention is concerned with a restraint or strap adjustment and fastening apparatus for restraining an occupant and other items. More specifically, the present invention is concerned with an occupant restraint adjustment and fastening apparatus for a push chair, stroller, wheelchair or like transportation device or seat.

It is well understood that restraining an occupant in a seat in an e.g. stroller or push chair is desirable. In particular, restraining a child prevents them from climbing out of the seat and thereby injuring themselves, particularly if the seat is on a push chair or stroller in transit. Five-point restraints are the most common, in which five strap portions are provided constructed from a flexible, but inextensible webbing material. Two shoulder portions pass from the seat, over the occupant's shoulders. Two waist portions pass around the occupant's waist, and a fifth groin portion extends from the seat base between the legs. All five strap portions meet at a central buckle. Typically, the buckle is permanently attached to the groin strap portion, and the shoulder and waist strap portions are releasably attached to the buckle.

A common problem faced by the operators of such devices (which in the case of a push chair or stroller is typically not the occupant, but rather a parent or other carer) is the adjustment of the restraint. The need for adjustment stems from the requirement to have a well-fitting restraint. Loose restraints will not properly secure the occupant, and in the case of children they may wriggle free. In the event of an impact, or other sudden change in velocity or direction, the occupant may be ejected from the seat if the restraint is not tight enough. Therefore, there is a need to properly adjust the restrain to suit the size of the occupant. Adjustment is necessary in a number of scenarios.

In a first scenario, as the child occupant grows, the restraint needs to be adjusted to accommodate. A two-year old child is usually significantly larger than a 6-month old child.

In a second scenario, the seat may be used by a number of different sized occupants of different sizes, and/or ages at different times.

In a third scenario, an occupant's clothing may cause them to be larger or smaller. For example, during unexpected rainfall, the operator may need to put a coat on the occupant. The bulkiness of the coat may result in the restraint being uncomfortably tight. Conversely, when a coat needs to be removed, the restraint may be too loose on the occupant.

Existing restraints typically have some kind of adjustment mechanism. Such mechanisms are typically strap sliders provided on each strap portion (or at least some of them). Therefore individual adjustment of each strap portion is required to adjust the restraint. Further, strap sliders are difficult to use under tension, and, for example, adjustment of the strap portion with an occupant in-situ is difficult. It is more usual to unfasten the restraint, and possible remove the occupant before attempting adjustment, which is undesirable.

It is an aim of the present invention to overcome, or at least mitigate, the aforementioned problems.

In accordance with a first aspect of the invention there is provided an occupant restraint apparatus comprising:
- an occupant restraint for restraining an occupant in use; and,
- an adjustment apparatus comprising an actuation assembly comprising a body and a rotatable control;
- in which the actuation assembly is configured to adjust the occupant restraint wherein rotation of the rotatable control relative to the body tightens the occupant restraint.

Advantageously, the use of a "turn to tighten" control provides simple and easy adjustment for the operator. The use of rotation movement is also advantageous because it allows the strap adjustment to be geared, such that a high degree of adjustment can be achieved with a small rotation.

In accordance with a second aspect of the invention there is provided an occupant restraint adjuster comprising:
- a body;
- a first member;
- a second member; and,
- an occupant restraint strap entering the body at a first position, looping around the first member, extending to and looping around the second member, and exiting the body at a second position spaced apart from the first, such that the strap forms an "S" shape;
- wherein at least one of the first and second members is moveably mounted to the body so as to vary the distance between the first member and the second member;
- such that relative movement of the first member and the second member changes the effective length of the strap.

Advantageously, this provides simple adjustment with a 2:1 gearing such that movement of the moveable member by a first distance will adjust the strap by twice the length.

The second aspect may be combined with the first aspect, as will be described, such that rotation of the control member effects linear movement of the moveable member in the adjuster.

In accordance with a third aspect of the invention there is provided an actuation assembly for a restraint adjustment apparatus, the actuation assembly comprising:
- a housing configured to receive a strap adjuster;
- a rotatable member;
- a drive formation arranged to engage a strap adjuster assembled with the housing;
- in which the rotatable member is rotatable to drive the drive formation.

In accordance with a fourth aspect of the invention there is provided a strap apparatus comprising:
- a strap for restraining an item; and,
- an adjustment apparatus comprising an actuation assembly comprising a body and a rotatable control;
- in which the actuation assembly is configured to adjust the strap wherein rotation of the rotatable control relative to the body tightens the strap.

In accordance with a fifth aspect of the invention there is provided a strap adjuster comprising:
- a body;
- a first member;
- a second member; and,
- a strap entering the body at a first position, looping around the first member, extending to and looping around the second member, and exiting the body at a second position spaced apart from the first, such that the strap forms an "S" shape;
- wherein at least one of the first and second members is moveably mounted to the body so as to vary the distance between the first member and the second member;
- such that relative movement of the first member and the second member changes the effective length of the strap.

Advantageously, this provides simple adjustment with a 2:1 gearing such that movement of the moveable member by a first distance will adjust the strap by twice the length.

The fifth aspect may be combined with the fourth aspect, as will be described, such that rotation of the control member effects linear movement of the moveable member in the adjuster.

In accordance with a sixth aspect of the invention there is provided an actuation assembly for a strap, the actuation assembly comprising:
a housing configured to receive a strap adjuster;
a rotatable member;
a drive formation arranged to engage a strap adjuster assembled with the housing;
in which the rotatable member is rotatable to drive the drive formation.

Advantageously, the fourth to sixth aspects can be used in a range of applications where an item needs to be secured, for example in luggage applications, for animals or livestock or general cargo.

An example occupant restraint adjustment and fastening apparatus in accordance with the present invention will now be described with reference to the drawings in which:

FIGS. 8a to 8c are various perspective views of a first component of the subassembly of FIG. 4;

Figure 1:
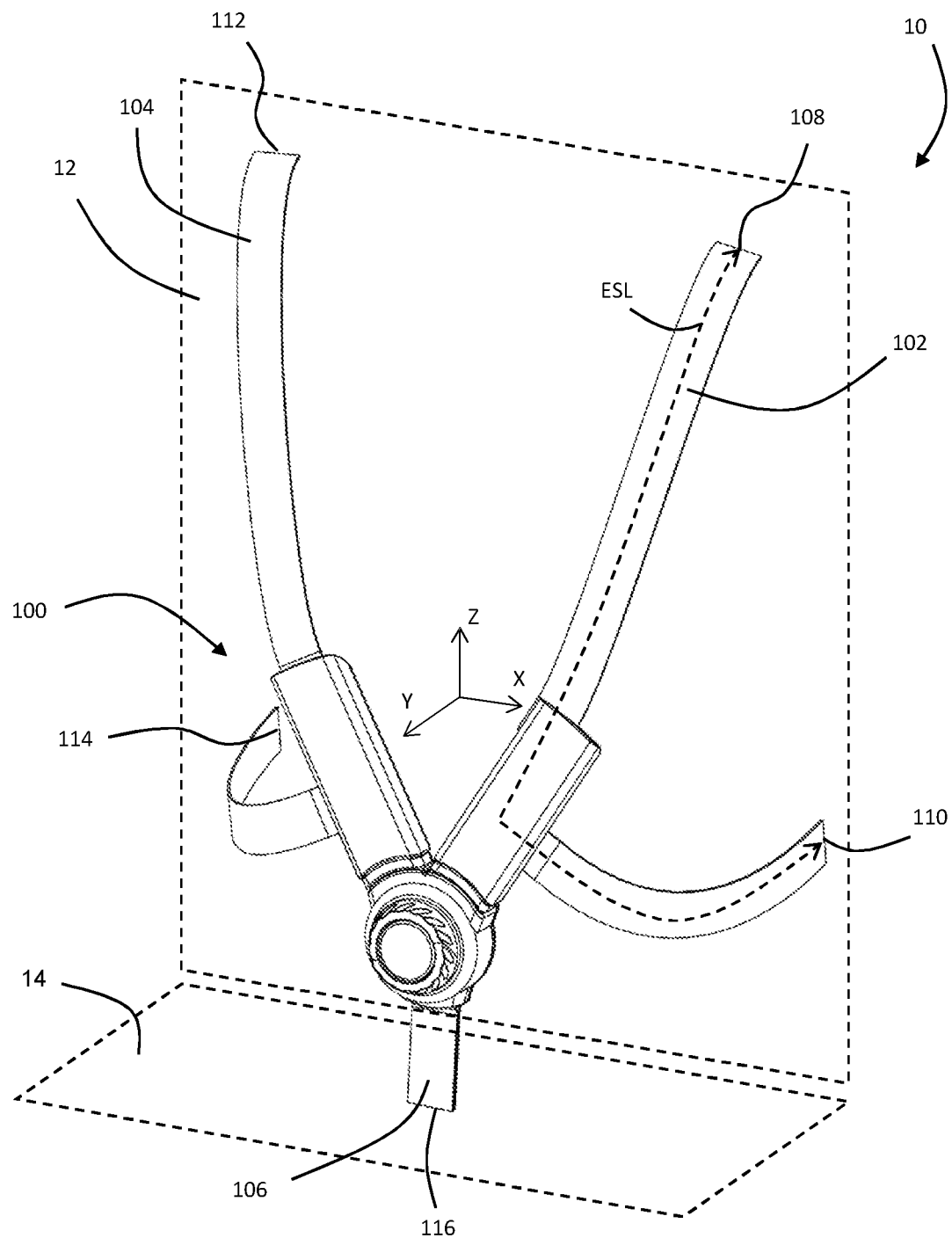
FIG. 1 is a perspective, schematic view of a seat having an occupant restraint adjustment and fastening apparatus in accordance with the present invention installed thereon.

Referring to FIG. 1, there is shown schematically a seat 10 comprising a seat back 12 and a seat pan 14. It will be understood that by "seat", the present invention is not limited to any particular type of structure. The seat 10 may be part of a chair, vehicle, pushchair, stroller, wheelchair or any other type of structure, static or moveable, that an occupant can sit in or on.

In the following description, the terms front, rear, upper, lower and left and right will be referred to from the point of view of an occupant in the seat 100. As shown in FIG. 1, the +Y direction is forward, or to the front, the +Z direction is up and the +X direction is towards the left.

Figure 2:
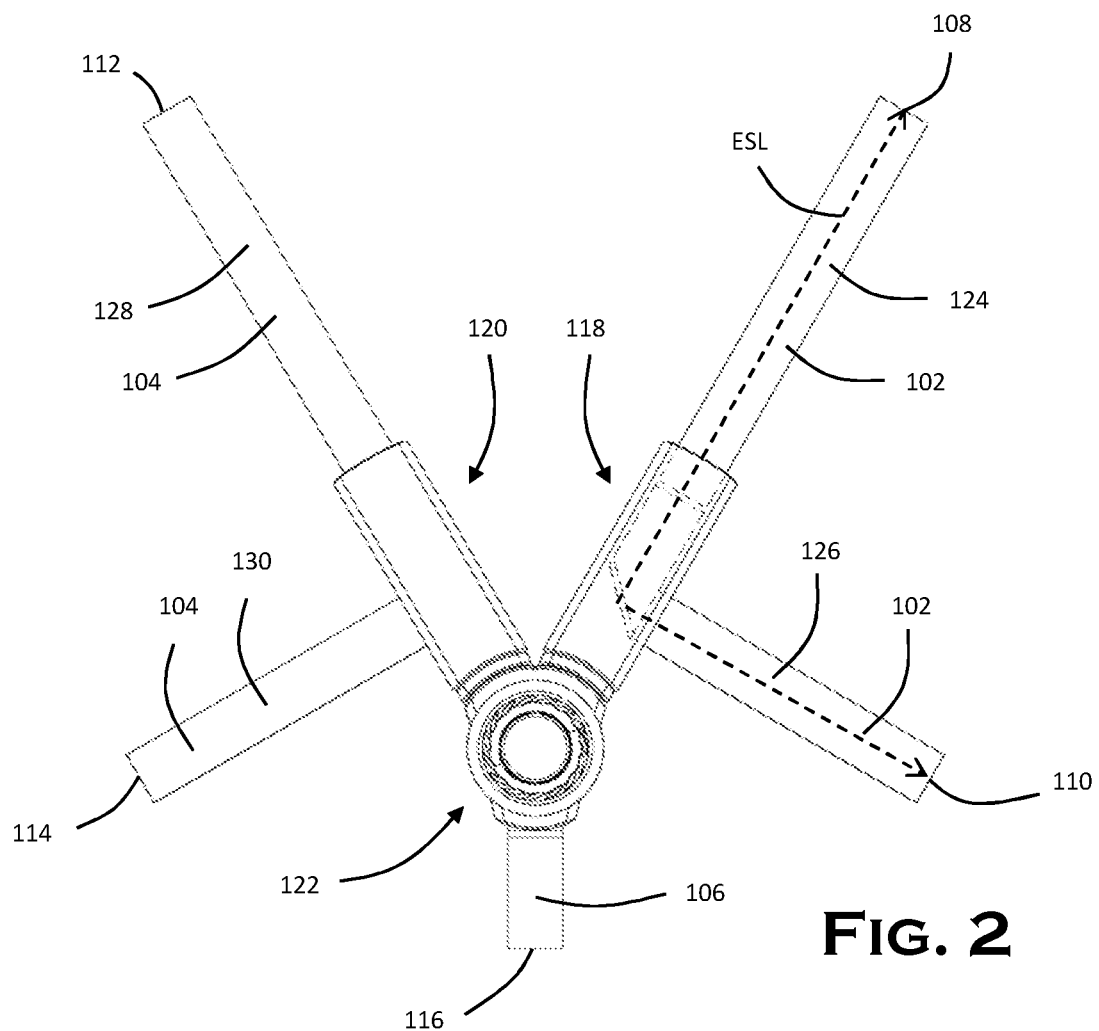
FIG. 2 is a front view of the apparatus of FIG. 1.

Attached to the seat 10 there is provided an occupant restraint adjustment and fastening apparatus 100 (hereafter referred to as the "apparatus" 100). With reference to FIGS. 1 and 2, the apparatus 100 comprises an occupant restraint having a left strap 102, right strap 104 and a groin strap 106. Each strap 102, 104, 106 is constructed from standard seat belt webbing material such as woven nylon, polypropylene or polyester. Such materials in this form are flexible yet substantially inextensible and are well known in the art. The left strap 102 extends from an upper anchor point 108 on the upper left-hand side of the seat back to a lower anchor point 110 on the seat back, lower than the upper anchor point 108. The right strap 104 extends from an upper anchor point 112 on the upper right-hand side of the seat back to a lower anchor point 114 on the seat back, lower than the upper anchor point 112. The groin strap 106 extends from a groin anchor point 116 on the seat pan 14.

Figure 3:
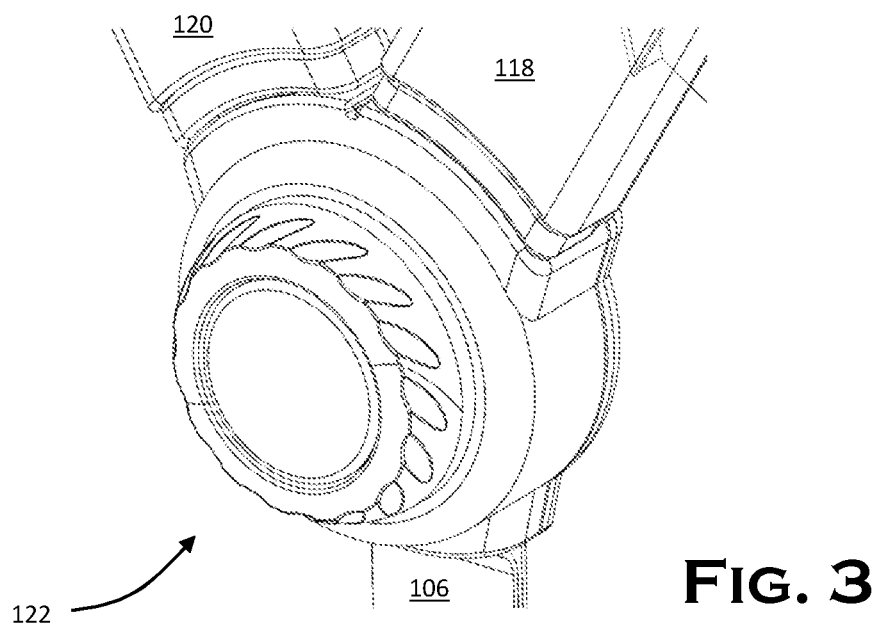
FIG. 3 is a detail perspective view of a part of the apparatus of FIG. 1.

Referring to FIGS. 2 and 3, the apparatus 100 comprises two adjusters in the form of a left strap clip assembly 118 and a right strap clip assembly 120. The apparatus also comprises an actuation assembly in the form of a buckle 122.

Each strap 102, 104 is fed through its respective strap clip assembly 118, 120. As such, each strap is divided into two portions. The left strap 102 comprises a left strap shoulder portion 124 extending from the upper anchor point 108 to the left strap clip assembly 118, and a left strap waist portion 126 extending from the left strap clip assembly 118 to the lower anchor point 110. The right strap 104 comprises a right strap shoulder portion 128 extending from the upper anchor point 112 to the right strap clip assembly 120 and a right strap waist portion 130 extending from the right strap clip assembly 120 to the lower anchor point 114.

Each of the left and right straps 102, 104 has an effective strap length ESL as shown in FIG. 2 with respect to the left strap 102. The effective strap length is variable depending on the operational state of the respective strap clip assembly (as will be described in detail below). The effective strap length is independent of the total length of webbing utilised in the strap between the upper and lower anchor point. This is known as the total strap webbing length TSWL. In all states of the apparatus 100, ESL<TSWL.

Strap Clip Assembly 118

The strap clip assemblies 118, 120 are identical with the exception that they are mirror images of each other. As such, the left strap clip assembly 118 will be described in detail, and the differences between it and the strap clip assembly 120 also described.

Figure 4:
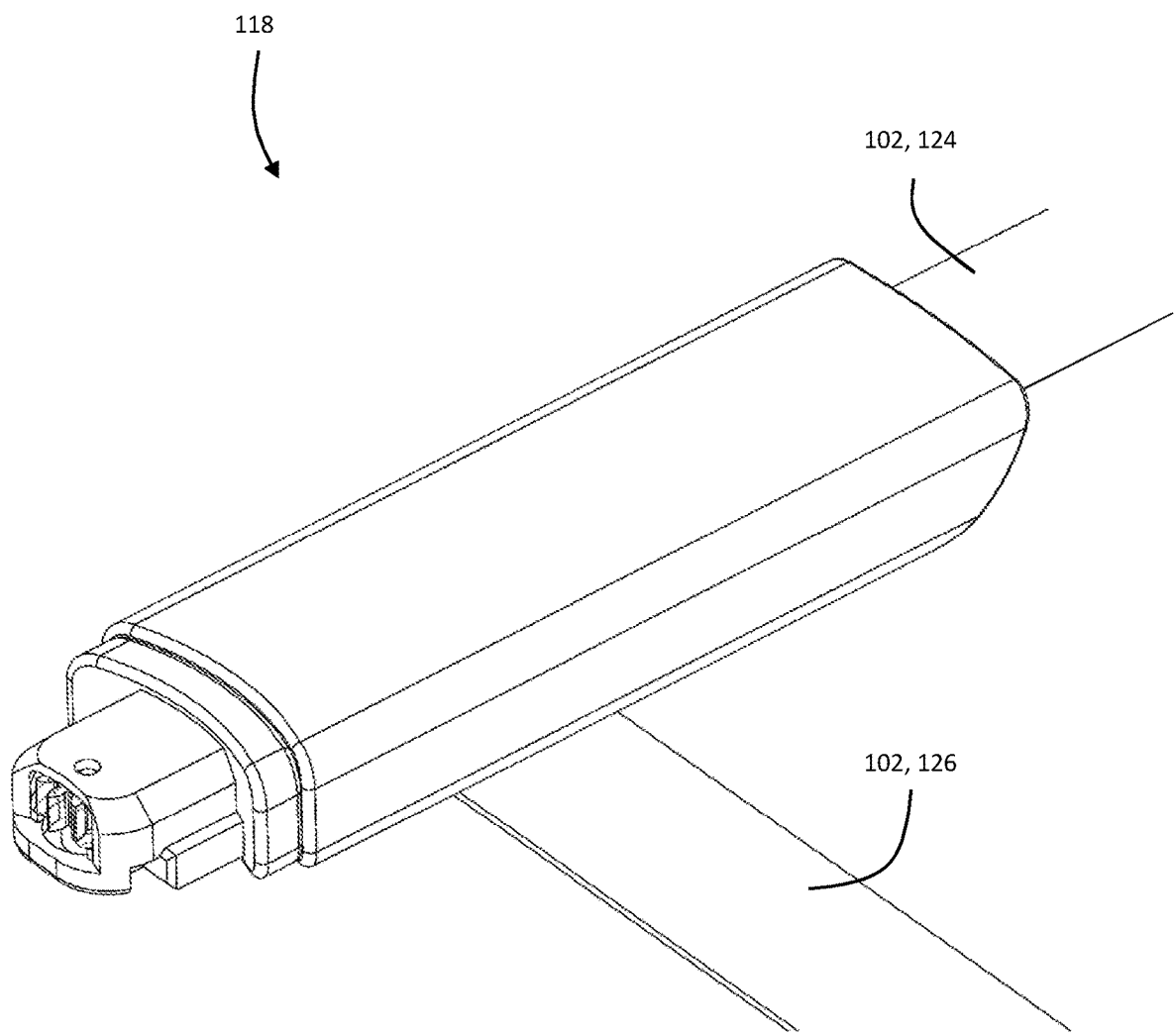
FIG. 4 is a perspective view of a first subassembly of the apparatus of FIG. 1.
Figure 5:
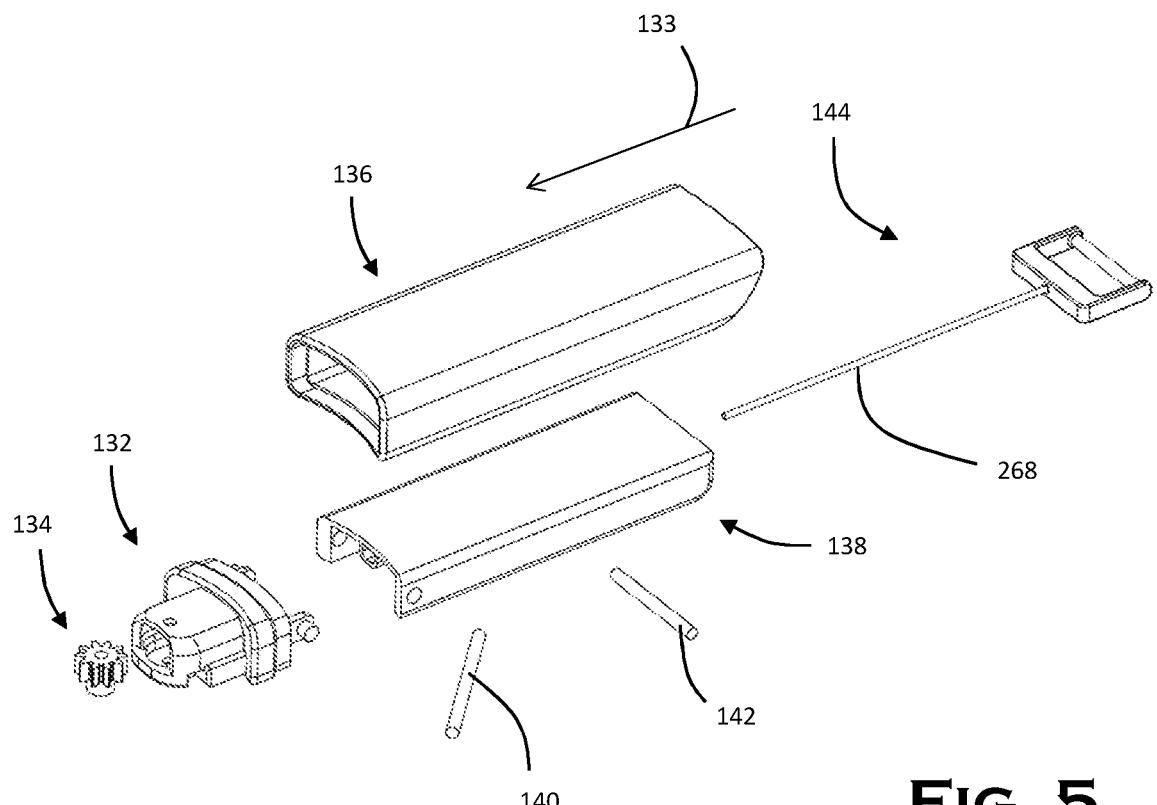
FIG. 5 is a first perspective exploded view of the subassembly of FIG. 4.
Figure 6:
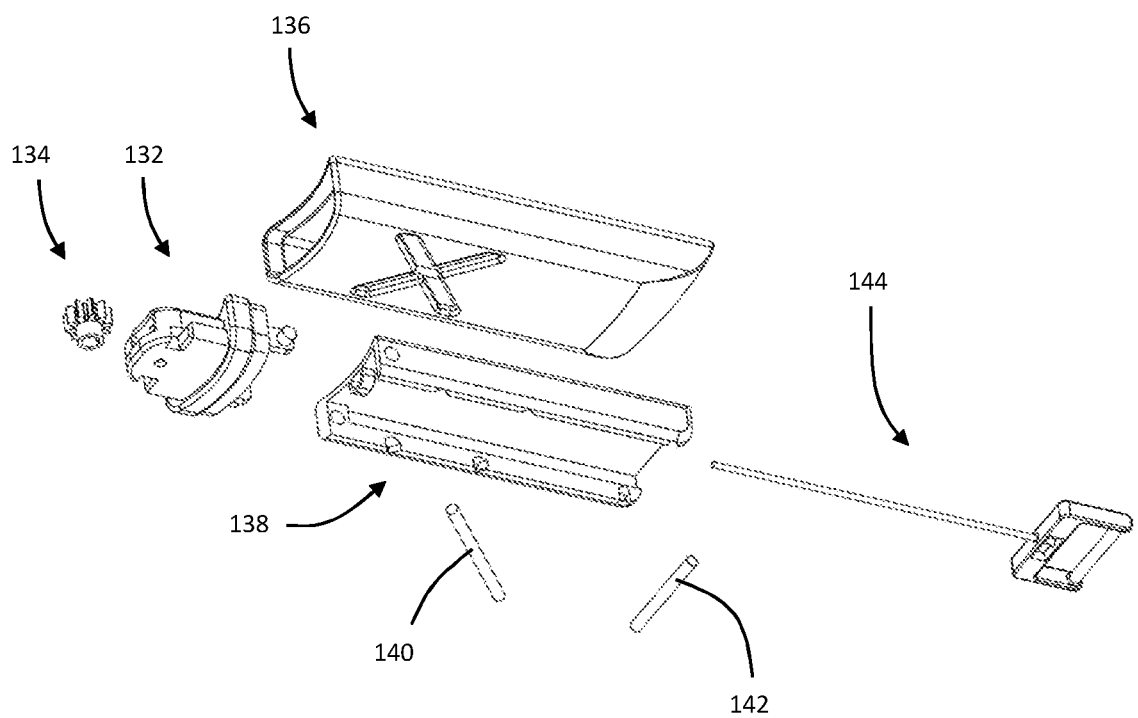
FIG. 6 is a second perspective exploded view of the subassembly of FIG. 4.
Figure 7:
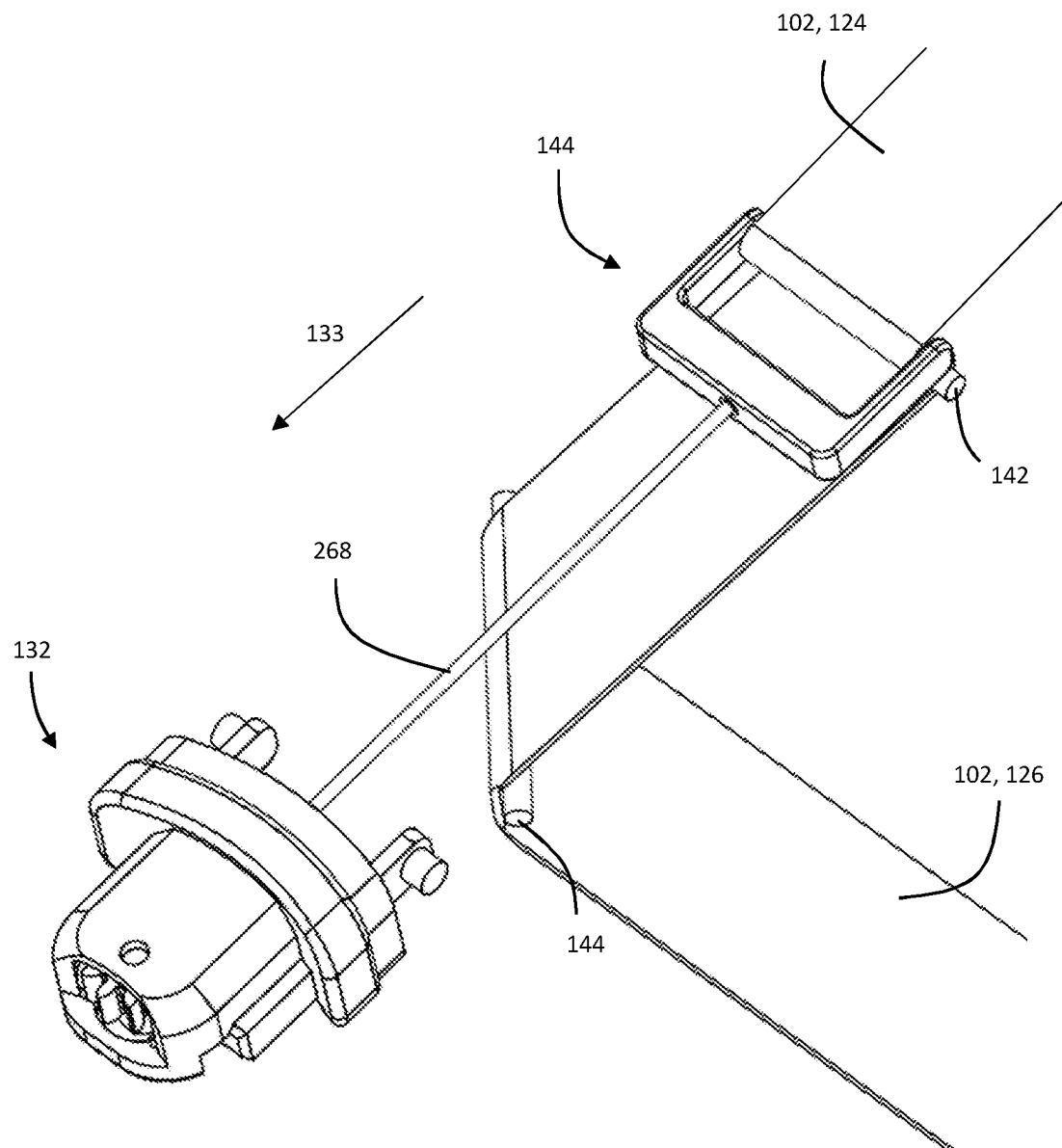
FIG. 7 is a perspective view of a subset of components of the subassembly of FIG. 4.

Referring to FIG. 4, a detail view of the strap clip assembly 118 is provided. FIGS. 5 and 6 show exploded perspective views. FIG. 7 shows a view with some parts removed.

Referring to FIGS. 5 and 6, the left strap clip assembly 118 comprises an engagement member 132, a gear 134, a housing 136, a slide track 138, a first shaft 140, a second shaft 142 and a pulley 144.

Engagement Member 132

The engagement member 132 is shown in more detail in FIGS. 8a to 8c. The engagement member 132 is a unitary, hollow component constructed from e.g. an injection moulded plastics material. It has a projecting portion 146, a shoulder portion 148 and two projecting arms 150, 152. The engagement member 132 defines a first engagement direction 133.

The projecting portion 146 is generally cuboidal in shape, having a front wall 154, a rear wall 156 and first and second sidewalls 158, 160. The four walls 154, 156, 158, 160 form a rectangle in cross section. The projecting portion defines a first opening 162 at a first, free, end and a second opening 164 at a second end where it meets the shoulder portion 148. The rear wall 156 projects past the first opening 162 to form a lip 166. The projecting portion has an inwardly tapered portion 168 towards the first opening when viewed from the front.

The front wall 154 and rear wall 156 each define a shaft aperture 170, 172 respectively. The bearing apertures are therefore spaced apart, and are coaxial, lying on a gear axis 174, perpendicular to the first engagement direction 133. The rear wall 156 defines two opposed inwardly projecting notches 176, 178 each defining a respective abutment surface 180, 182.

Two ridges 184, 186 are provided on each respective sidewall 158, 160 proximate the rear wall 156 and extend from the notches 176, 178 to meet the shoulder portion 148.

The shoulder portion 148 is annular and generally rectangular in shape, being both wider and taller than the projecting portion 146. The shoulder portion defines a first shoulder surface 184 adjacent and facing in the same direction the projecting portion 146. The shoulder portion 148 defines a first region 186 proximate the projecting portion, and a second region 188 on the opposite side of the first region 186 to the projecting portion 146. The second region 188 is smaller than the first region 186 creating a second shoulder surface 190, opposite the first shoulder surface 184.

The first and second arms 150, 152 project from the second region of the shoulder portion 148 in the opposite direction to the projecting portion 146, and opposite to the first engagement direction 133. Each 150, 152 arm has a respective free end 192, 194. An outwardly projecting stub shaft 196, 198 is defined at each respective free end. The stub shafts 196, 198 are coaxial, lying on a joint axis 200 which is perpendicular to both the first insertion direction 133 and the gear axis 174.

Gear 134

Figure 9:
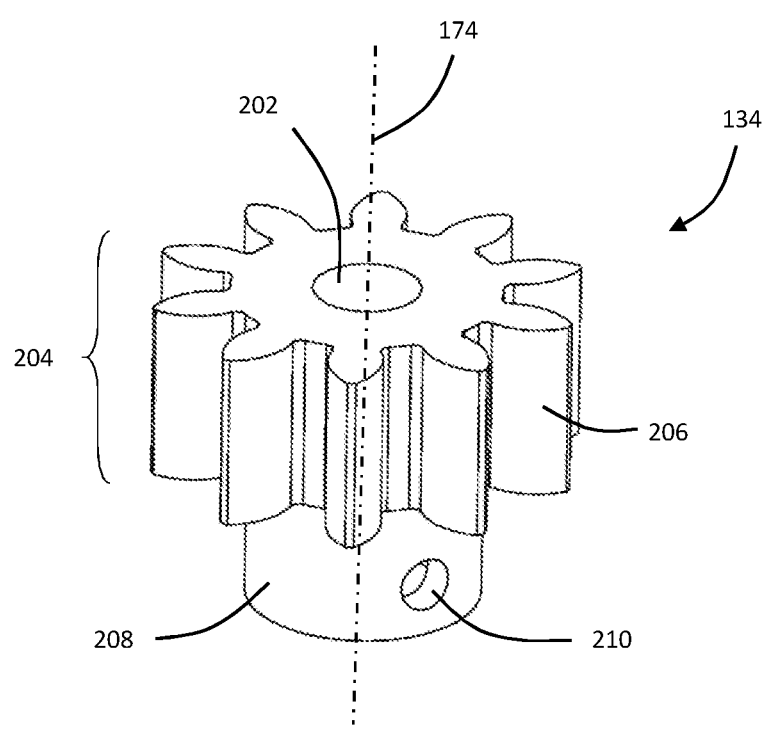
FIG. 9 is a perspective view of a second component of the subassembly of FIG. 4.

The gear 134 is shown in detail in FIG. 9. Gear 134 is a unitary component, and constructed from metal. The gear 134 has an open bore 202 therethrough on the gear axis 174. The gear 134 defines a spur gear formation 204 defining a plurality of teeth 206. Adjacent to the spur gear formation 204 there is provided a reel portion 208 defining a bore 210 in a sidewall thereof, oriented normal to the gear axis 174.

Housing 136

Figure 10A:
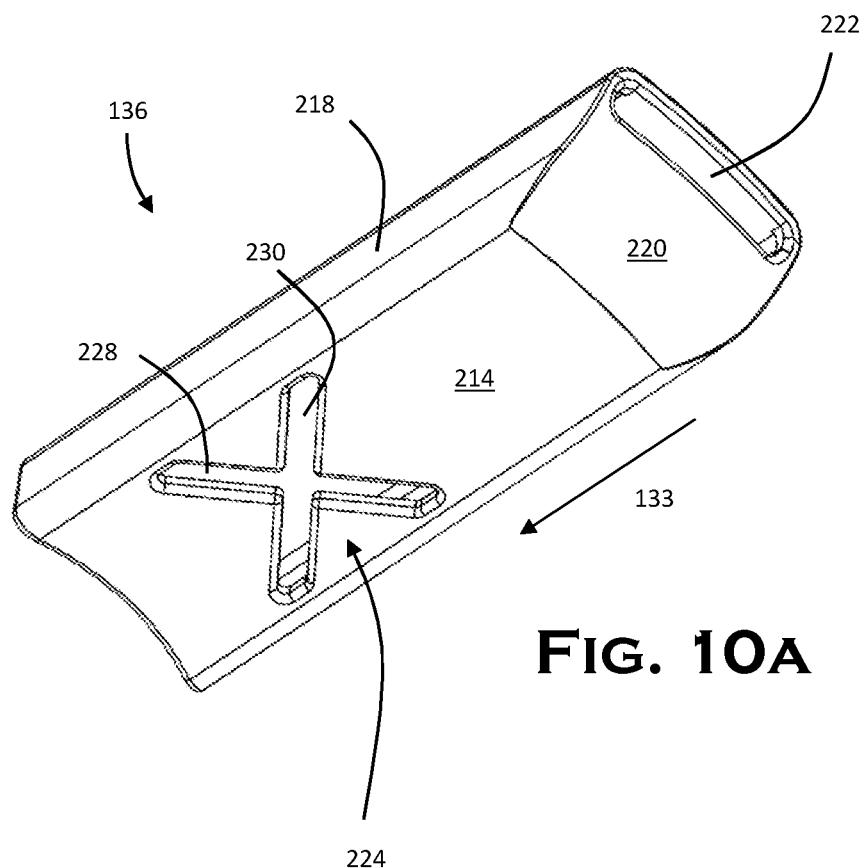
FIGS. 10a and 10b are various perspective views of a third component of the subassembly of FIG. 4.
Figure 10B:
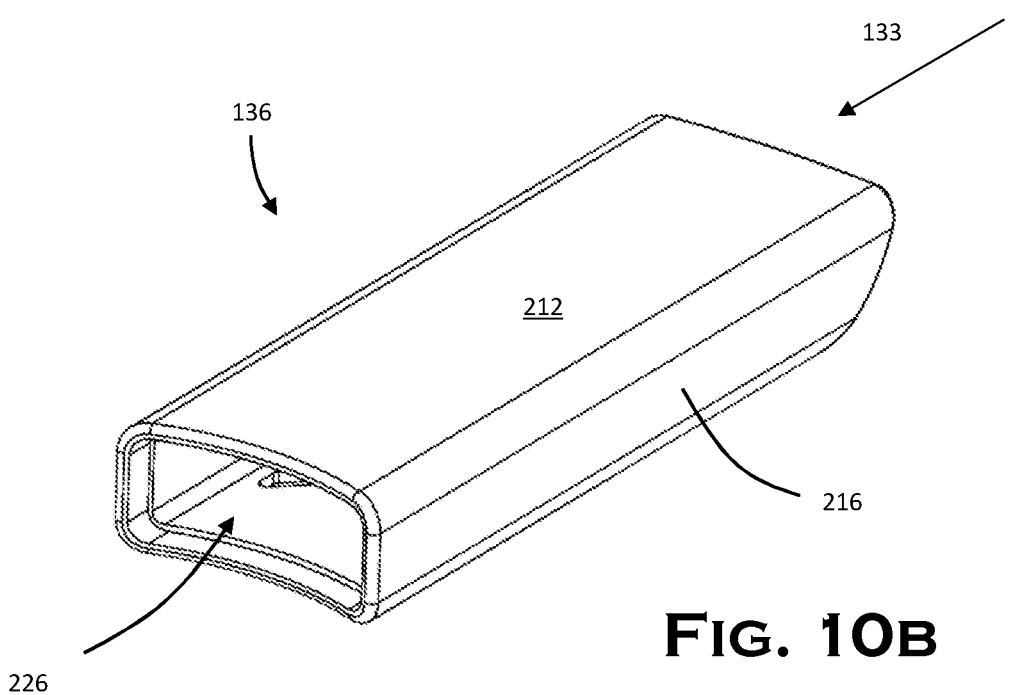

The housing 136 is shown in detail in FIG. 10. The housing 136 is a hollow, elongate component constructed from plastics material. The housing 136 defines a front wall 212, rear wall 214, and first and second sidewalls 216, 218. The walls 212, 214, 216, 218 define a rectangular cross-section such that the housing is generally cuboidal in shape.

At one end, the rear wall joins a tapered end wall 220 which extends at an angle towards the front wall 212 forming a tapered end to the housing 136. A first strap opening 222 is disposed between the tapered end wall 212 and the front wall 212. The first strap opening 222 is narrow and elongate.

A second strap opening 224 is defined in the rear wall. The second strap opening has a first leg 228 at an angle of 45 degrees to the first engagement direction, and a second leg 130 at an angle of 45 degrees to the first engagement direction. The legs 228, 230 are at 90 degrees to each other and thus form the second strap opening 224 in the shape of an "X".

An engagement opening 226 is provided at the end of the housing 136 opposite the end defining the first strap opening 222. The second strap opening 224 is nearer to the engagement opening 226 than to the first strap opening 222.

Slide Track 138

Figure 11A:
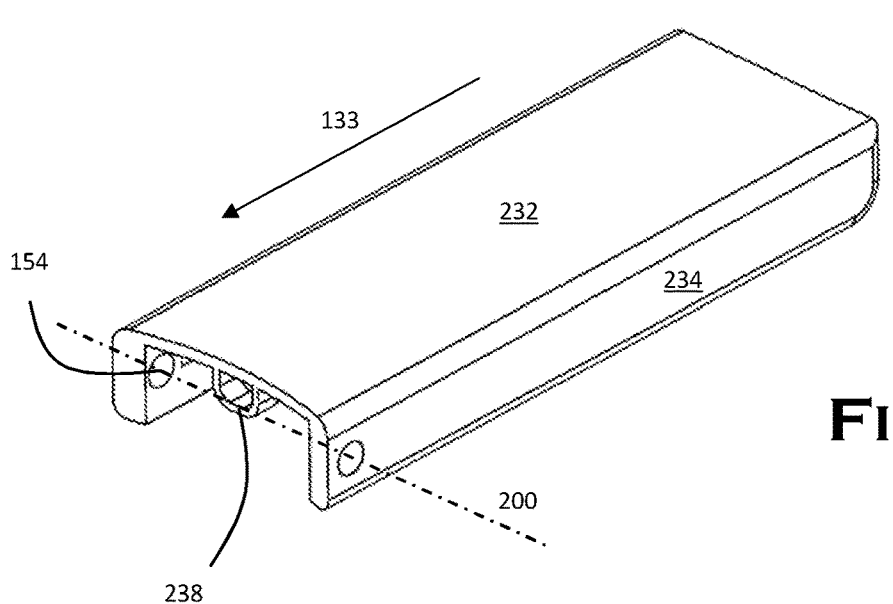
FIGS. 11a to 11c are various perspective views of a fourth component of the subassembly of FIG. 4.
Figure 11B:
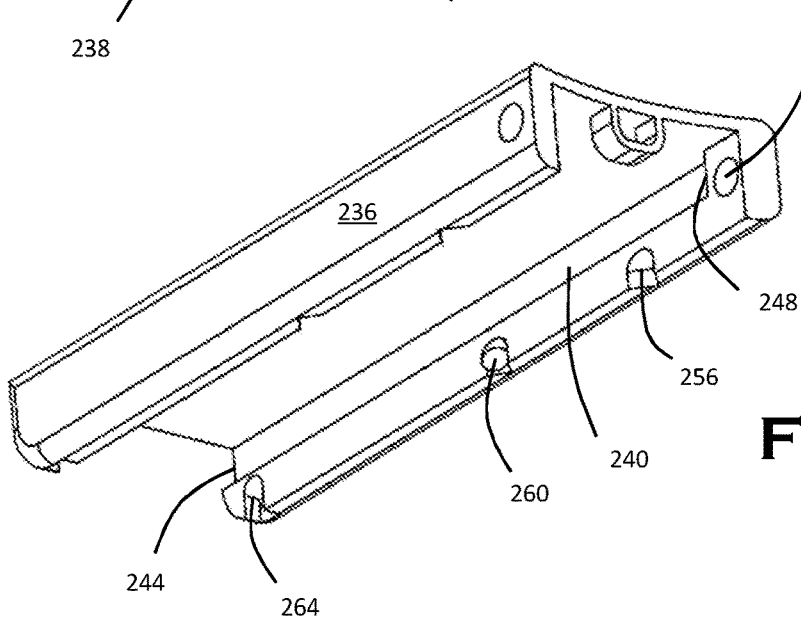
Figure 11C:
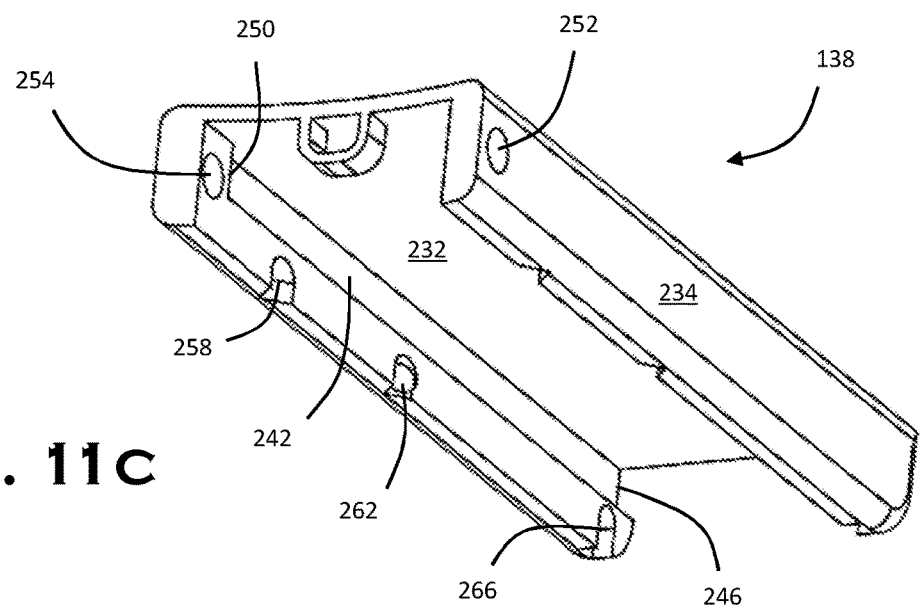

The slide track 138 is shown in detail in FIGS. 11a to 11c. The slide track 138 is constructed from a plastics material and is generally shaped as a "C" section component.

The slide track defines a front wall 232 and first and second sidewalls 234, 236. The walls 232, 234, 236 define a C-shaped cross-section such that the slide track 138 forms an open channel. At a first end of the slide track 138, a wire guide 238 extends from the front wall 232 defining a closed loop.

On the inside of the slide track 138, where each sidewall 234, 238 meets the front wall 232 there is provided an elongate slide channel 240, 242 having a respective open end 244, 246 and a closed end 248, 250.

Proximate each closed end 248, 250, each sidewall 234, 236 defines a respective bearing opening 252, 254 therethrough. The bearing openings 252, 254 are coaxial and lie on the joint axis 200.

Each of the sidewalls further defines a respective first 256, 258, second 260, 262 and third 264, 266 shaft notch on the interior side thereof. The shaft notches are spaced apart along the first engagement direction 133.

First Shaft 140/Second Shaft 142

The shafts 140, 142 are cylindrical members constructed from metal material.

Pulley 144

Figure 12:
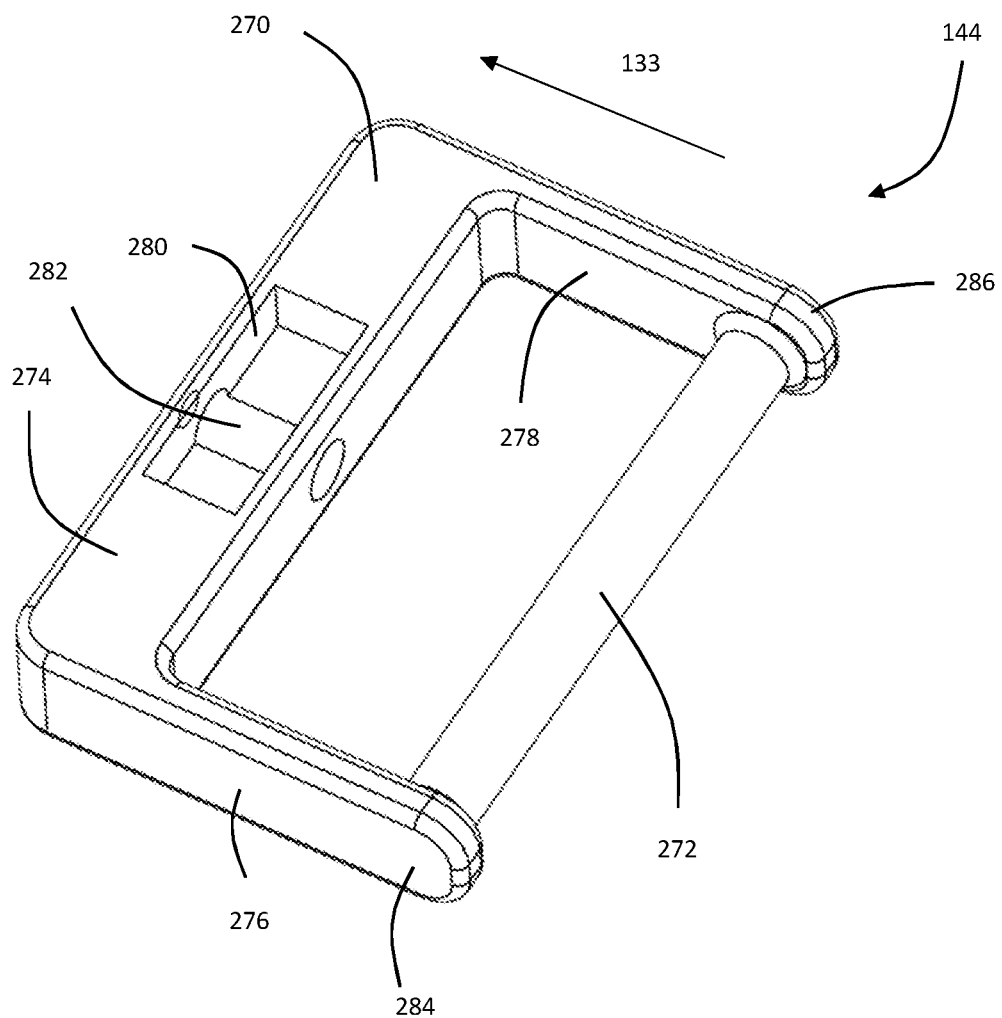
FIG. 12 is a perspective view of a fifth component of the subassembly of FIG. 4.

The pulley 144 is shown in more detail in FIG. 12. The pulley 144 comprises a wire 268 (shown in FIGS. 5 to 7), a frame 270 and a pulley shaft 272. The wire 268 is a flexible yet inextensible component constructed from a metal material (e.g. steel wire). The frame 270 is generally "U" shaped and constructed from a plastics material. The frame 270 comprises a cross-member 274 with two parallel legs 276, 278 extending therefrom at either end. The cross-member 274 defines an aperture 280 therethough. Spanning the aperture 280 in the engagement direction 133 there is provided a cylindrical wire channel 282 being open at either end. Each leg 276, 278 defines a free end 284, 286.

The pulley shaft 272 extends between the free ends 284, 286 of the legs 276, 278, perpendicular to the engagement direction 133.

The strap clip assembly 118 is assembled as follows.

The gear 134 is mounted in the projecting portion 146 of the engagement member 132 by means of a shaft (not shown) which lies on the gear axis 174. The shaft is a push fit with the shaft apertures 170, 172, and engages the open bore 202 of the gear 134 such that it is rotatable thereon. One end of the wire 268 is attached to the reel portion 208 of the gear 134 by means of the bore 210.

The other end of the wire 268 feeds through the wire guide 238 in the housing, through the wire channel 282 in the frame 270 of the pulley 144 and attached thereto. Therefore the wire 268 forms a tension load path between the gear 134 and the pulley 144.

The first shaft 140 is mounted into the slide track 138 by engagement with the first shaft notch 256 on the first sidewall 234, and the second shaft notch 262 on the second sidewall 236 such that the shaft 140 is at a 45 degree angle to the engagement direction 133 (FIG. 7).

The second shaft engaged the respective third shaft notches 264, 266 of the first and second sidewalls 234, 236 such that it is normal to the engagement direction 133.

The pulley 144 is assembled in sliding engagement with the slide track 138 by engaging the edges of the frame 270, and the two legs 276, 278 in the slide channels 240, 242. The pulley 144 is thus in free sliding engagement with the slide track 138 in the engagement direction 133.

The slide track 138 is assembled with the engagement member 132 by elastically deforming the arms 150, 152 inwards and releasing them such that the stub shafts 196, 198 engage the bearing openings 252, 254. In this manner, the slide track 138 is pivotably relative to the engagement member 132 about the joint axis 200.

The housing 136 engages the engagement member 132 by mating with the second region 188 of the shoulder portion 148. The second region 188 enters the engagement opening 226 such that the end of the housing 134 bears against the shoulder surface 190. The housing covers the slide track 138 and the components therein. Because the housing 136 is flexible, it permits pivoting of the slide track 138 relative to the engagement member 132.

The left strap 102 engages the left strap clip assembly 118 as follows.

Figure 13A:
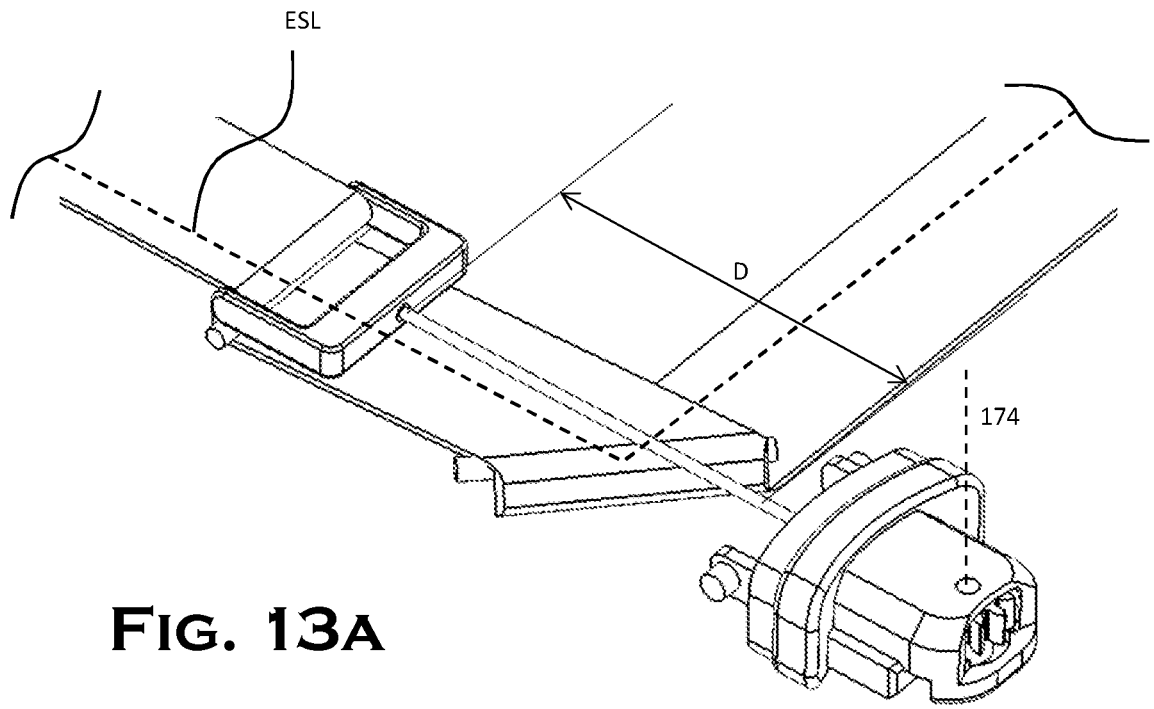
FIGS. 13a and 13b are similar to FIG. 7, and show the subset of components in two different conditions.
Figure 13B:
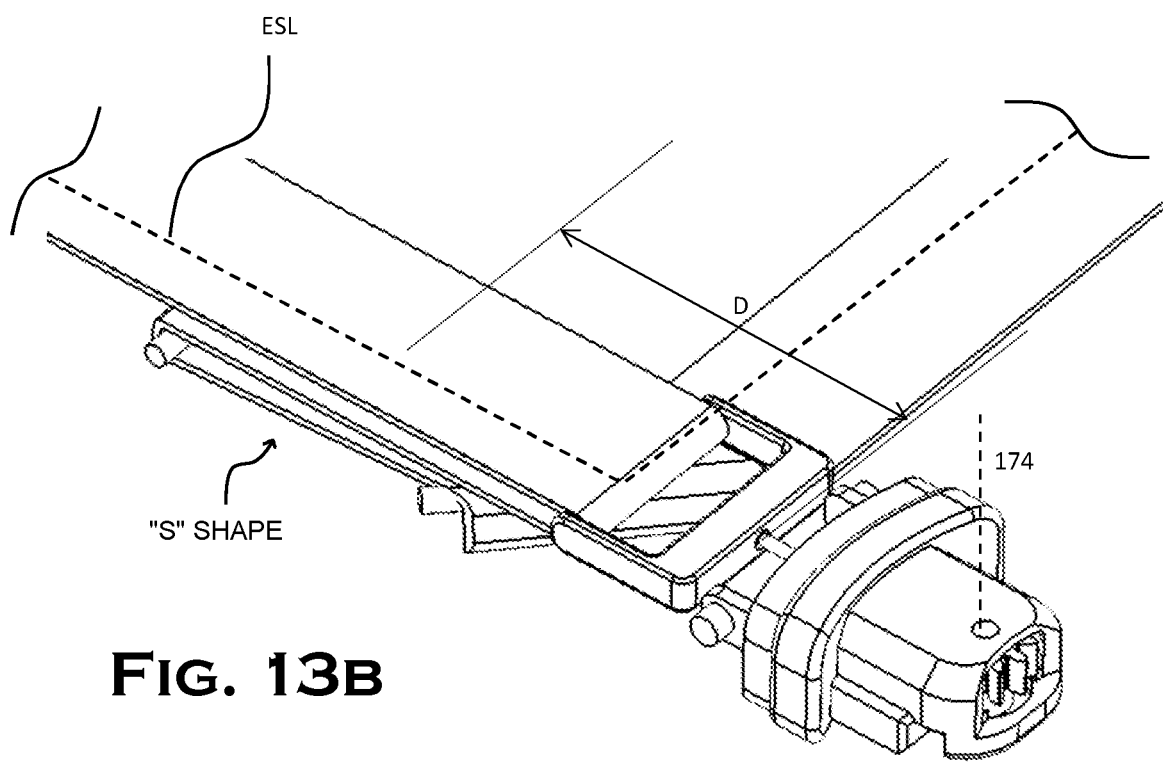

The left strap 102, from the strap waist portion 126 passes through the second leg 230 of the second strap opening 224 in the housing 136. It wraps around the first shaft 144 (FIG. 7), turning though 90 degrees parallel to the engagement direction 133. The left strap 102 then passes on the rear side of the second shaft 142, looping through 180 degrees to face in the insertion direction 133. The left strap then loops around the pulley shaft 272, through 180 degrees to exit the housing 136 at the strap shoulder portion 124, thereby forming an "S" shape (FIG. 13B).

The strap clip assembly 118 operates as follows.

Rotation of the gear 134 about the gear axis 174 causes the wire 268 to wind around the reel portion 208. This tensions the wire 268 which pulls the pulley 144 in the engagement direction 133. The pulley 144 slides in the slide track 138 (the tension being reacted through the stub shafts 150, 152) towards the engagement member 132. This increases the distance between the pulley shaft 272 and the second shaft 142.

Because the left strap 102 needs to travel from the second shaft 142, to the pulley shaft 272 and back before it reaches the strap shoulder portion 124, movement of the pulley by a distance D in the engagement direction ESL will shorten the effective strap length by 2D (although the total strap webbing length TSWL does not change). This is shown in FIGS. 13a and 13b. In the present embodiment, the range of adjustment is D=60 mm (i.e. total adjustment in ESL is 120 mm).

Strap Clip Assembly 120

The right strap clip assembly 120 is identical to the left strap clip assembly, with the exception that the first shaft 140 is mounted into the slide track 138 by engagement with the first shaft notch 258 on the second sidewall 236, and the second shaft notch 260 on the first sidewall 234. The right strap clip assembly 120 is therefore a mirror image of the left strap clip assembly 118.

It will be noted that the right strap 104 will enter the housing through the first leg 228 of the second strap opening 224 in the housing 136.

Buckle 122

Figure 14:
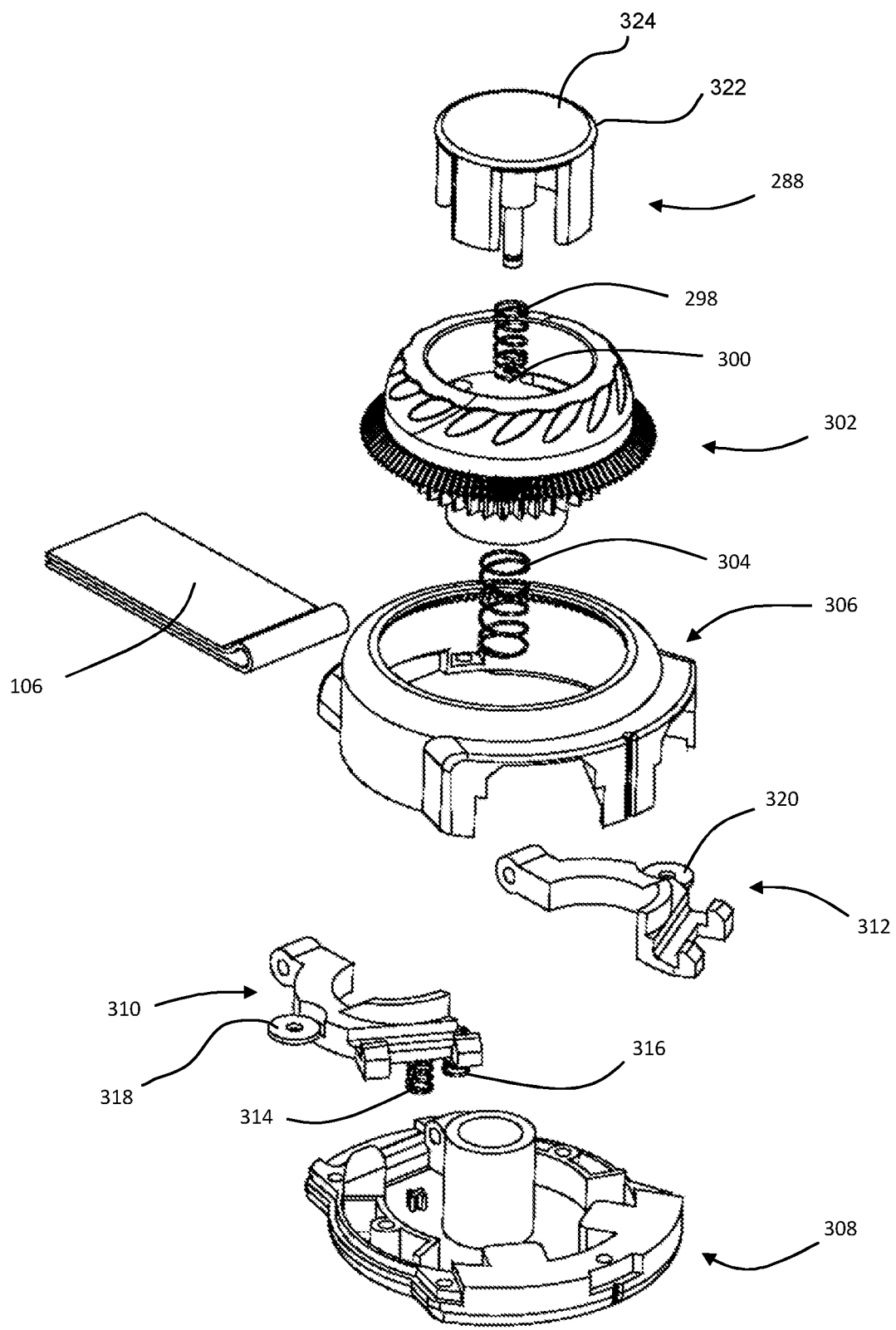
FIG. 14 is an exploded view of a second subassembly of the apparatus of FIG. 1.

An exploded view of the buckle 122 is shown in FIG. 14. The buckle 122 comprises:

A button 288;
A button spring 298;
A button spring circlip 300;
A dial 302
A dial spring 304;
A first housing part 306;
A second housing part 308;
A first clip arm 310;
A second clip arm 312;
A first clip arm spring 314;
A second clip arm spring 316;
A first clip arm washer 318; and,
A second clip arm washer 320.

Button 288

Figure 15:
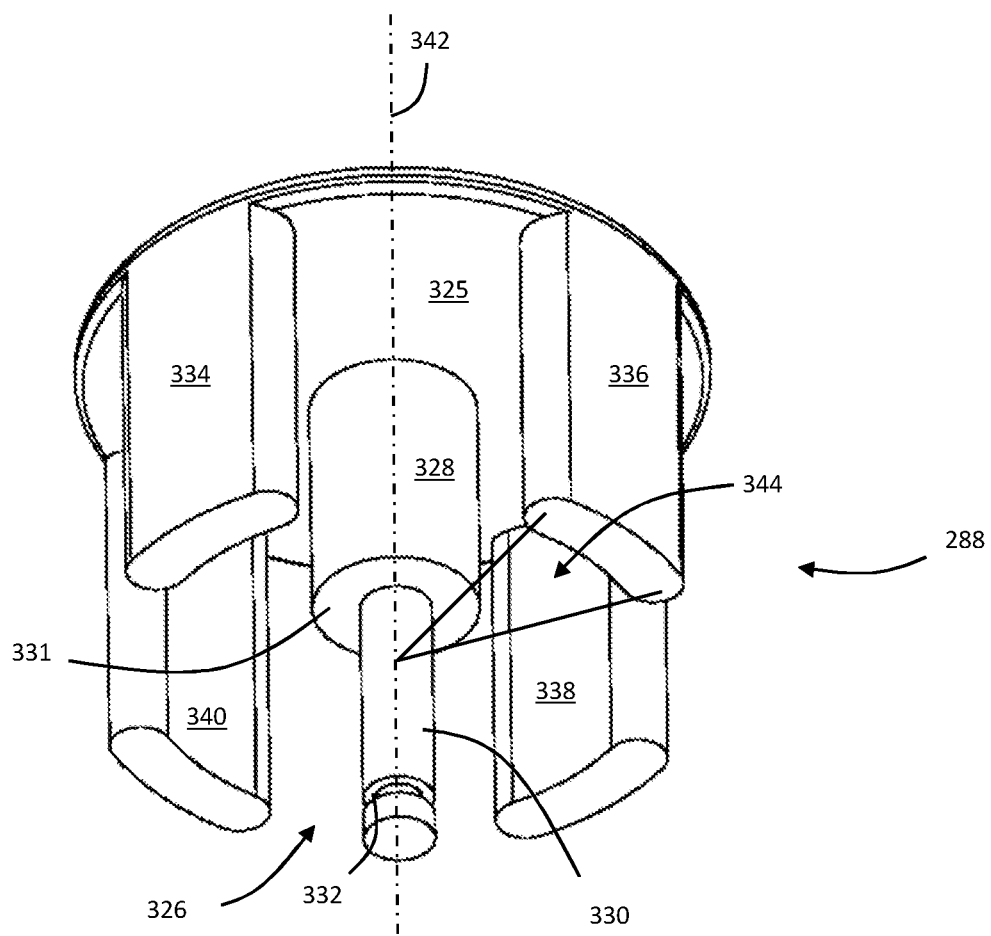
FIG. 15 is a perspective view of a first component of the subassembly of FIG. 14.

An underside view of the button 288 is shown in FIG. 15. The button comprises a circular base 322 having a contact surface 324 and an underside 325 opposite the contact surface 324.

A central shaft 326 extends from the geometric centre of the base 322 and defines an actuation axis 342. The central shaft 326 is generally in the shape of a stepped cylinder. It has a first portion 328 and a second portion 330 extending from the first portion 328. The second portion 330 has a diameter less than that of the first portion forming a shoulder 331. At a free end of the second portion 330 there is provided a circumferential groove 332.

Four identical and equally spaced legs 334, 336, 338, 340 extend from the underside 325 of the base 322. The legs are proximate the outer edge of the base 322 and each describe a circle segment having approximately the same diameter as the base 322. Each leg spans a leg angle 344.

Button Spring 298

The button spring 298 is a compression spring sized to receive the second portion 330 of the central shaft 326, but not the first portion 328.

Button Spring Circlip 300

The button spring circlip 300 is sized to fit into the groove 332 and extend therefrom when installed.

Dial 302

Figure 16A:
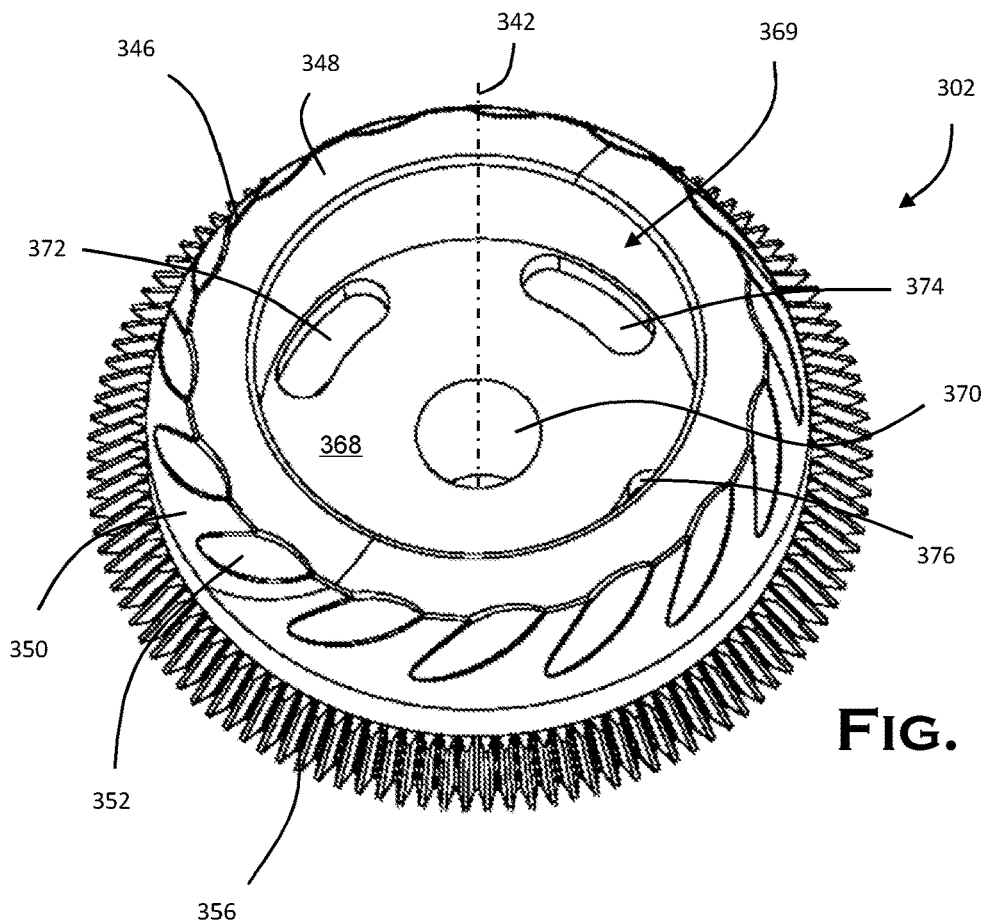
FIGS. 16a and 16b are perspective views of a second component of the subassembly of FIG. 14.
Figure 16B:
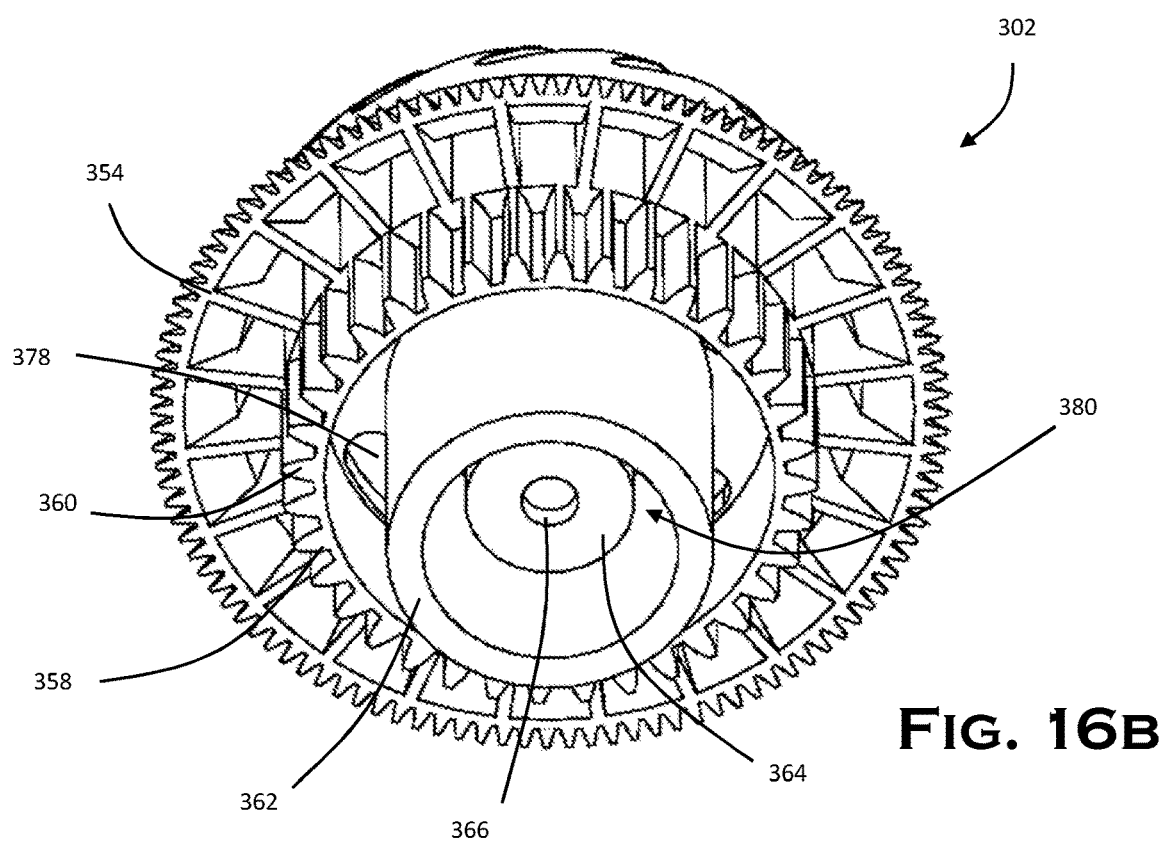

The dial 302 is shown in detail in FIGS. 16a and 16b. The dial 302 is generally circular about the actuation axis 342. The dial 302 is constructed from a moulded plastics material. The dial 302 comprises a contact section 346 defining an annular front face 348 and a tapered face 350. The annular front face 348 contains a recessed base 368 thus defining a button receiving opening 369.

The base defines a central bore 370 and four equally spaced leg openings 372, 374, 376, 378 which each describe a circle segment.

The tapered face 350 is at the outer periphery of the annular front face 348. The tapered face 350 defines a series of shallow grooves 352 which extend simultaneously circumferentially and axially.

Rearward and outboard of the contact section 346 there is provided a dial locking section 354 defining a plurality of axially and radially outwardly facing teeth 356.

Rearward and radially inboard of the dial locking section 354 there is provided a drive section 358 having a plurality of radially outwardly facing gear teeth 360 forming a spur gear.

Radially inboard of the drive section 358 and extending from the base 368 there is provided an outer collar 362 and an inner collar 364. The outer collar 362 is open ended. The inner collar 364 defines a core 366 in an endwall, being in communication with the bore 370. An annular region 380 is defined between the inner collar 364 and the outer collar 362.

Dial Spring 304

The dial spring 304 is a compression spring and is of larger diameter than the button spring 298.

First Housing Part 306

Figure 17A:
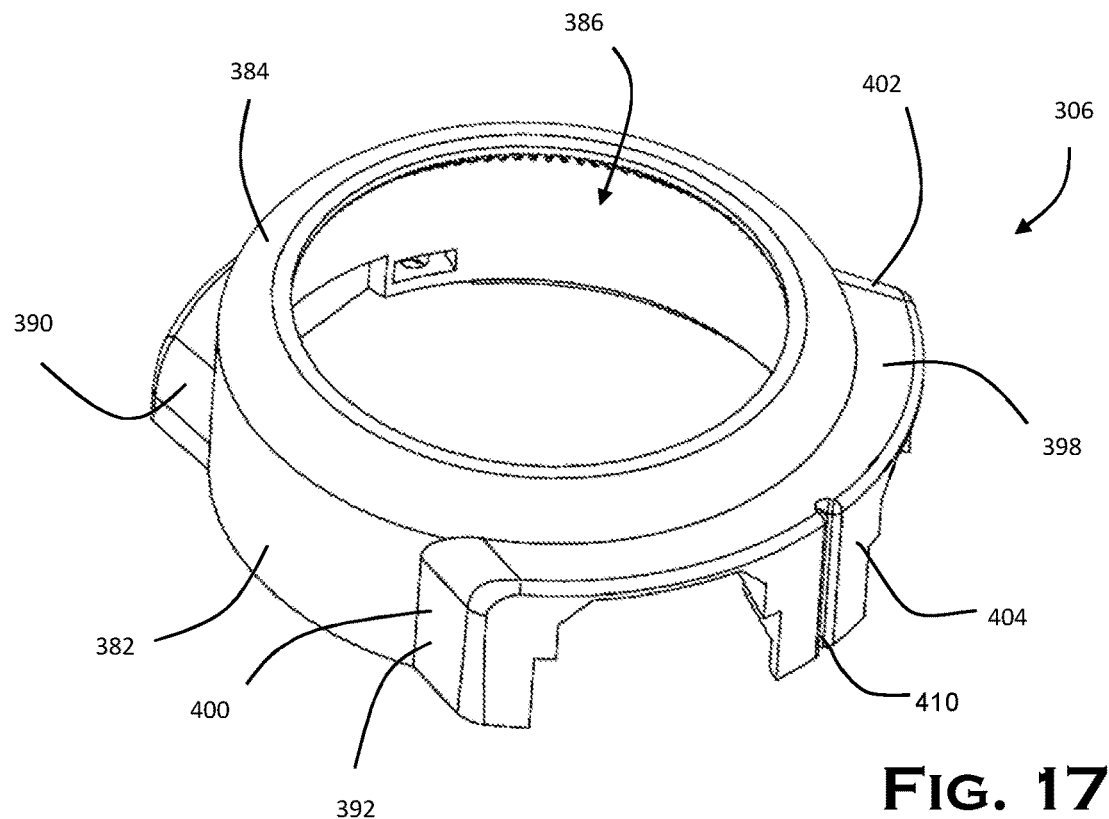
FIGS. 17a and 17b are perspective views of a third component of the subassembly of FIG. 14.
Figure 17B:
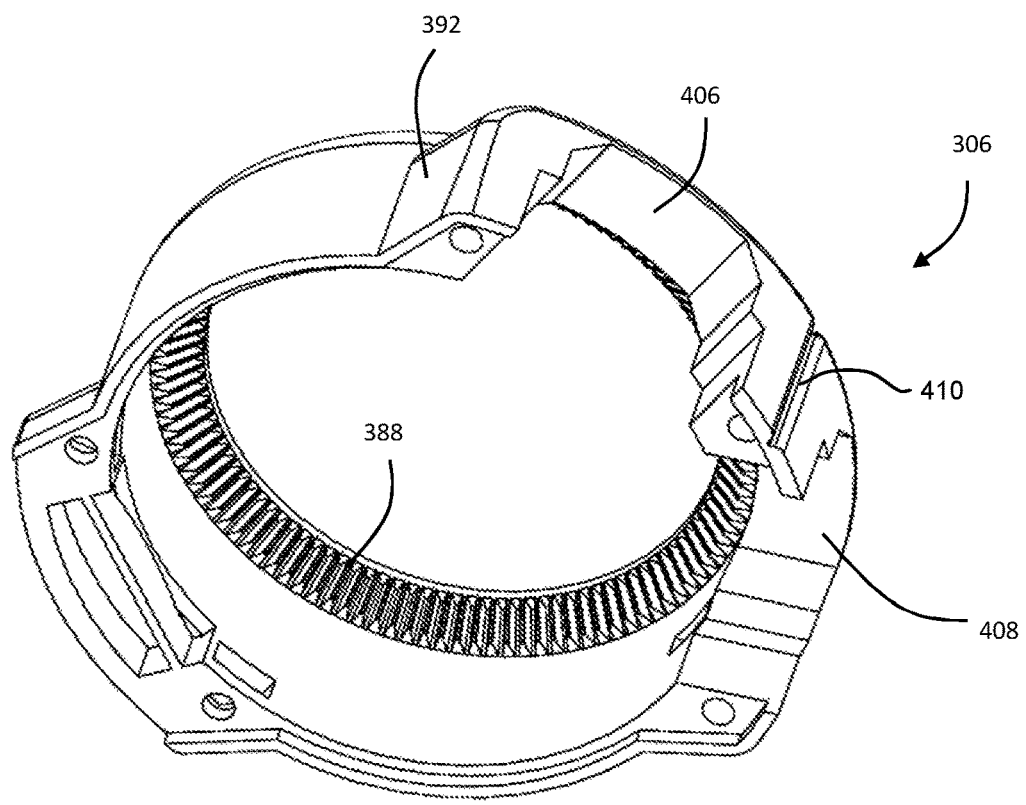

The first housing part 306 is shown in FIGS. 17a and 17b. The first housing part 306 is ring-shaped having an axially extending cylindrical sidewall 382 and a tapered annular wall 384 surrounding a central aperture 386. A plurality of locking teeth 388 are disposed on the underside of the tapered annular wall 384.

Extending radially outwardly from a first side of the sidewall 382 there is provided a groin strap attachment protrusion 390, and a left/right strap clip entry protrusion 392.

The left/right strap clip entry protrusion 392 wraps around the outer surface of the sidewall 382, and defines a circle segment front surface 398, two endwalls 400, 402 and an upper wall 404. The upper wall 404 defines a left strap clip opening 406 and a right strap clip opening 408, with an axial groove 410 therebetween.

Second Housing Part 308

Figure 18A:
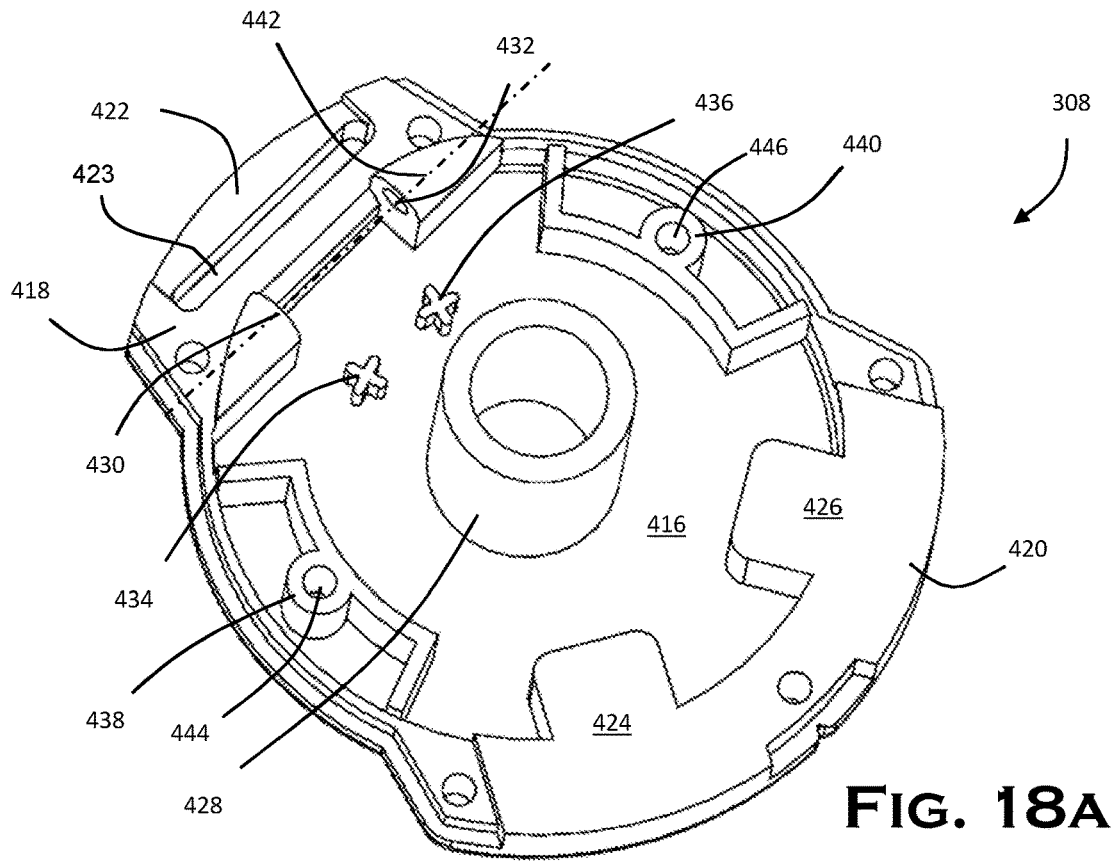
FIGS. 18a and 18b are perspective views of a fourth component of the subassembly of FIG. 14.
Figure 18B:
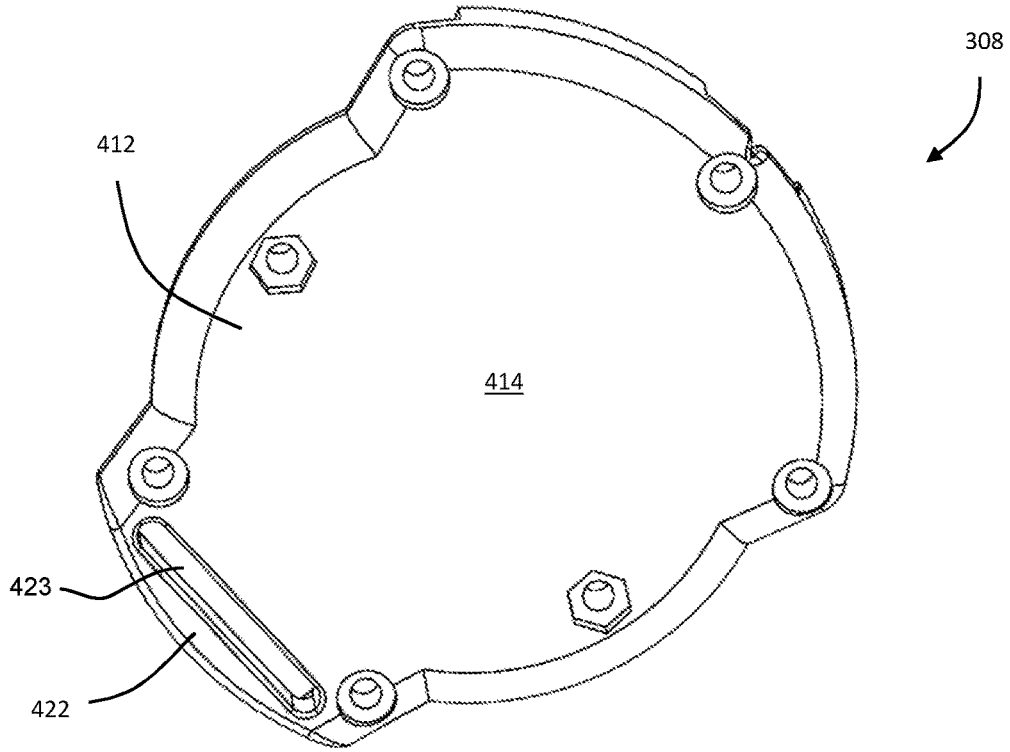

The second housing part 308 is shown in FIGS. 18a and 18b. The second housing part 308 is generally flat having a base portion 412. The base portion 412 has a front surface 416 and a rear surface 414.

Extending radially outwardly from a first side of the base portion 412 there is provided a groin strap attachment protrusion 418, and a left/right strap clip entry protrusion 420.

The groin strap attachment protrusion 418 comprises a strap bar 422 defining a slot 423.

The left/right strap clip entry protrusion 420 comprises a flat left clip support surface 424 and a flat right clip support surface 426.

A central collar 428 protrudes from the front surface 416 of the base 412 coaxial with the actuation axis 342.

Two clip arm shaft apertures 430, 432 are provided in respective bosses in the second housing part 308 and define a clip arm pivot axis 442 therebetween.

A first and second clip arm spring boss 434, 436 are also provided, projecting from the front surface 416 of the base portion 412. The spring bosses 434, 436 are provided between the clip arm shaft apertures, and the central collar 428.

At diametrically opposed positions either side of the collar 428 there are provide a first and second clip arm washer support 438, 440. Each washer support 438, 440 defines a respective bore 444, 446.

First Clip Arm 310

Figure 19A:
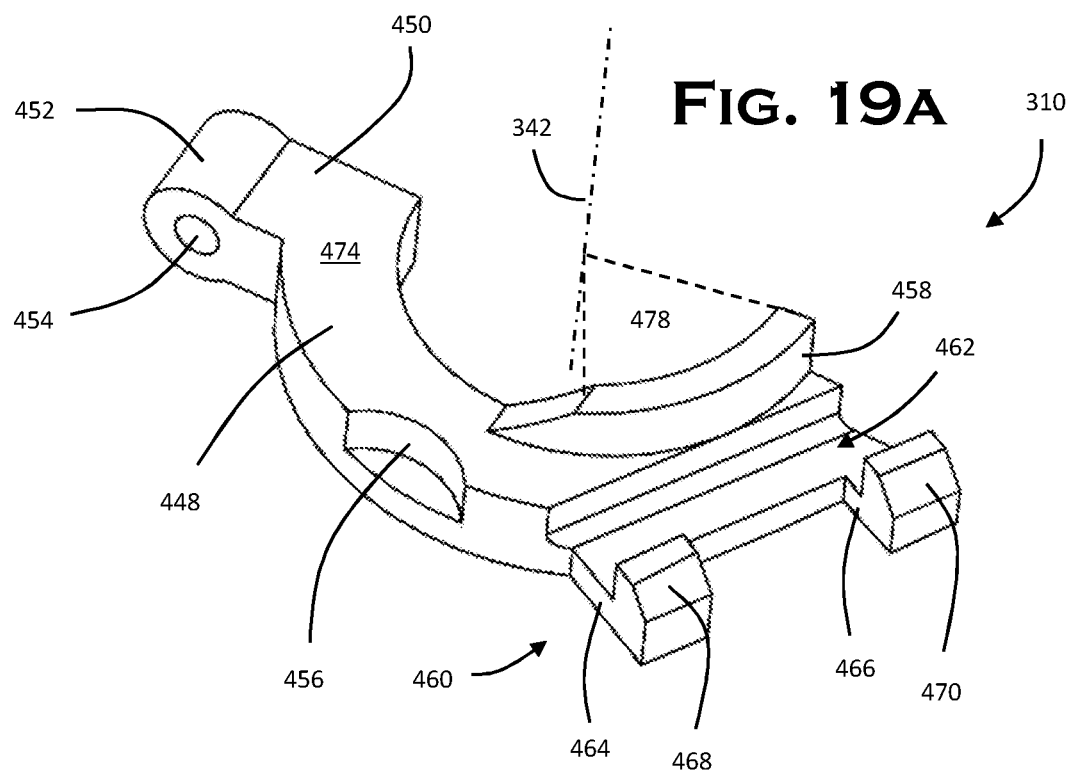
FIGS. 19a and 19b are perspective views of a fifth component of the subassembly of FIG. 14.
Figure 19B:
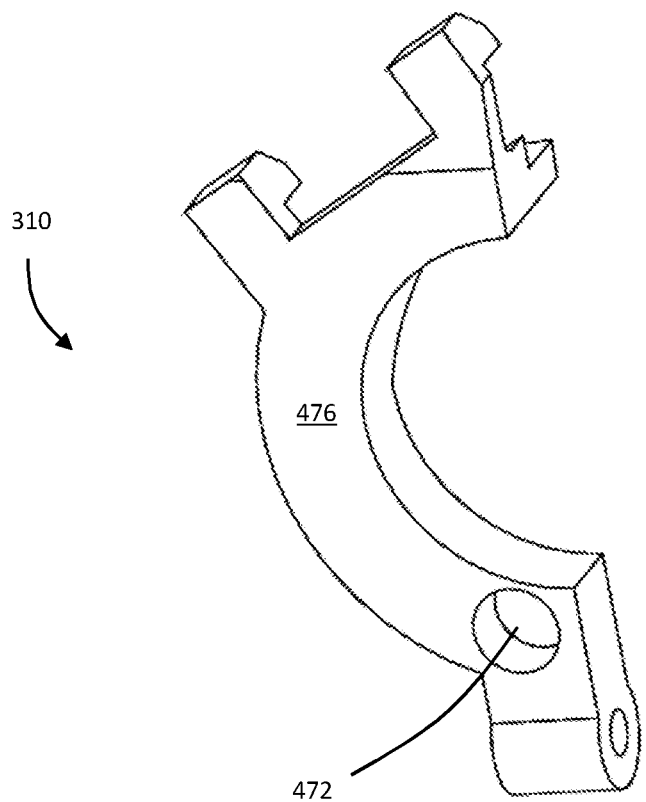

The first clip arm 310 is shown in FIGS. 19a and 19b. The first clip arm defines a front surface 474 and a rear surface 476. It comprises a generally semi-circular first body portion 448, and a radially extending second body portion 450. The first body portion 448 defines 180 degrees of an annulus. The second body portion 450 is straight and terminates in a boss 452 having an open bore 454 therethrough.

On the rear surface there is provided a blind spring recess 472 where the first and second body portions 448, 450 meet.

At approximately halfway round the first body portion 448 (i.e. at about 90 degrees) there is provided a washer notch 456 which is semi-circular in shape.

At the end of the first body portion 448 opposite the second body portion 450, there is provided an actuation member 458 extending axially from the front surface 474. The actuation member 458 is circle segment with an angle 478. The actuation member 458 extends to the free end of the first body portion 448.

Extending radially from the end of the first body portion 448 there is provided a clip 460. The clip 460 comprises a pair of spaced-apart arms 464, 466 with forwardly extending tabs 468, 470 extending normal thereto. The tabs 468, 470 define a clip recess 462 between them and the first body portion 448.

Second Clip Arm 312

The second clip arm 312 is a mirror image of the first clip arm 310.

First Clip Arm Spring 314/Second Clip Arm Spring 316

The first and second clip arm springs are compression springs.

First Clip Arm Washer 318/Second Clip Arm Washer 320

The first and second clip arm springs are metal washers.

The buckle 122 is assembled as follows.

Figure 20:
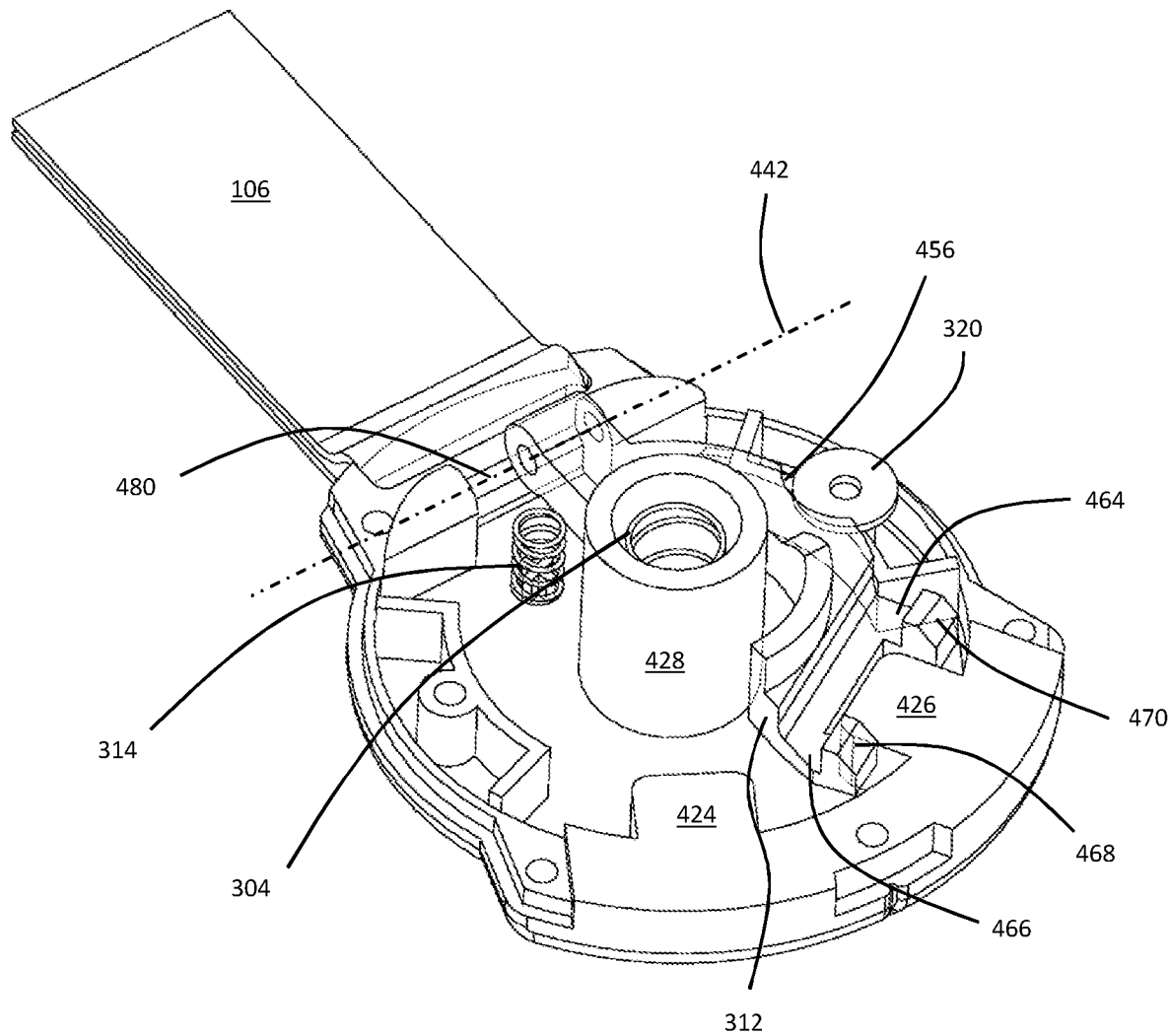
FIG. 20 is a front perspective view of the subassembly of FIG. 14 with some components removed.

With reference to FIG. 20, the groin strap 106 can be looped through the strap bar 422, through the slot 423 and sewn to itself to attach the buckle 122 to the groin strap 106.

The clip arm springs 314, 316 are mounted onto the clip arm spring bosses 434, 436. The clip arms 310, 312 are pivotably mounted to the second housing part 308 by passing a clip arm shaft between the clip arm shaft apertures 430, 432 through the open bores 454 on each clip arm 310, 312. In this way, the clip arms 310, 312 can pivot about the clip arm pivot axis 442.

It will be noted in FIG. 20 that the arms 464, 466 of the clip arms 310, 314 fall either side of the respective clip arm support surface 424, 426. The tabs 468, 470 project above the clip arm support surfaces 424, 426.

The clip arms 310, 312 are biased into a forward position (upward in FIG. 20) by the springs 314, 316 (only the clip arm 312 is shown).

The clip arm washers 318, 320 are installed on the clip arm washer supports 438, 440 such that they lie in the washer notches 456 of the clip arms 310, 312.

The dial spring 304 is inserted into the central collar 428.

As best shown in FIG. 14, the button 288 is assembled by threading the button spring 298 over the central shaft 326 so that it bears against the shoulder 331. The central shaft 326 and the spring 298 are then inserted into the bore 370 of the dial 302 and the button spring circlip 300 secured in the groove as the shaft 326 projects from the bore 366 of the dial 302. It will also be noted that the legs 334, 336, 338, 340 of the button pass through the leg openings 372, 374, 376, 378 in the dial 302.

In this way, the button can be depressed into the button receiving opening in the dial 302 but will resile under the action of the button spring 298.

Figure 21:
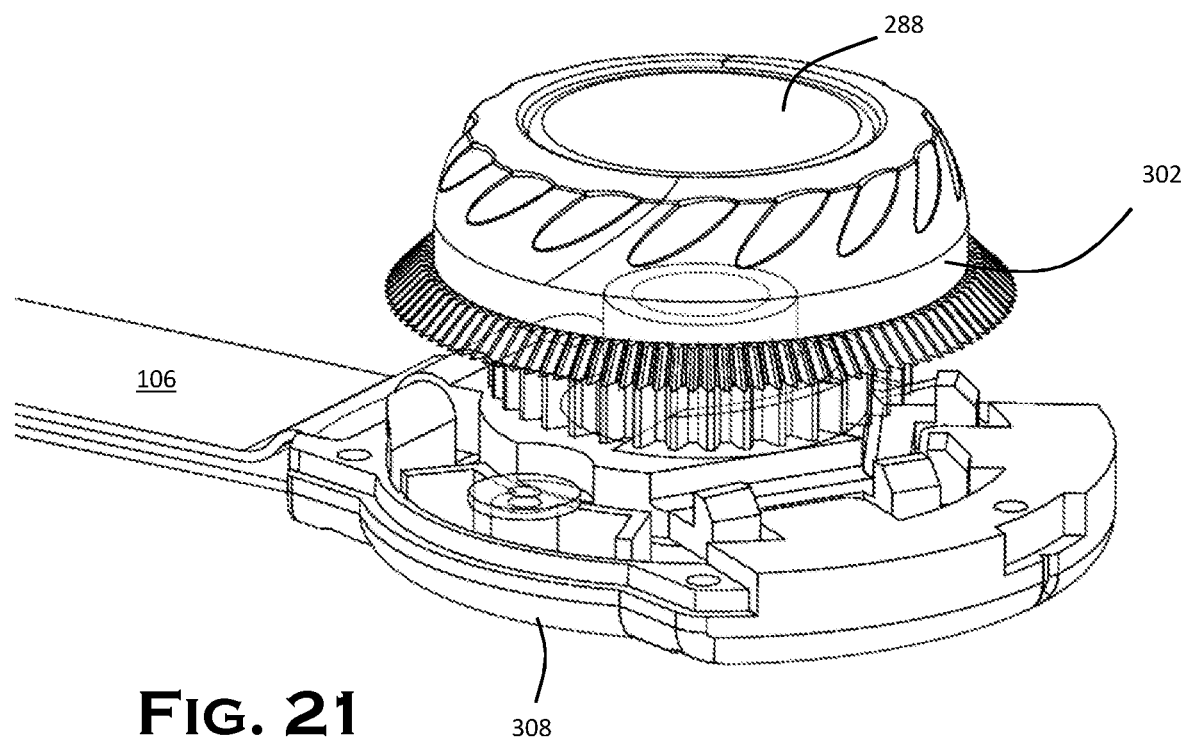
FIG. 21 is a further front perspective view of the subassembly of FIG. 14 with some components removed.
Figure 22:
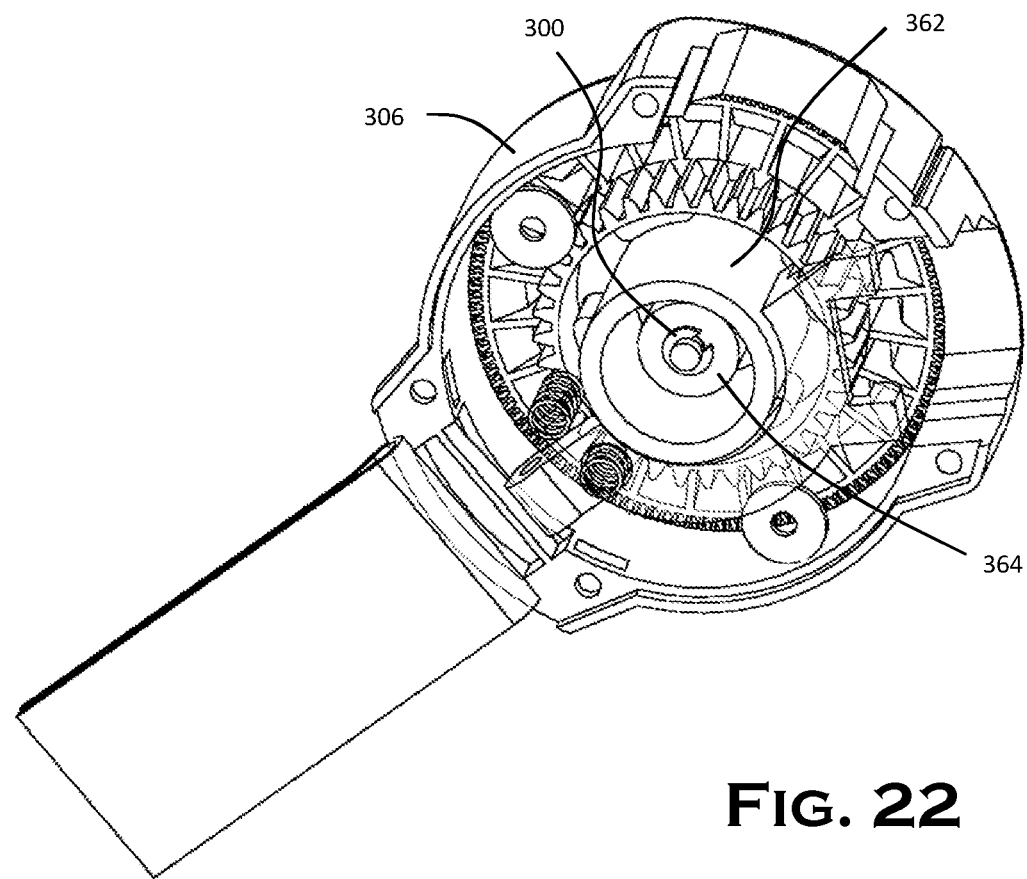
FIG. 22 is a rear perspective view of the subassembly of FIG. 14 with some components removed.

Referring to FIG. 21, the dial 302 has been assembled with the second housing part 308 by inserting the central collar 428 of the second housing part 308 into the annular region 380 of the dial 302. The end face of the inner collar 364 bears against the dial spring 304 urging the dial into a forward position.

The first housing part 306 is then assembled with the second housing part 308 to contain the mechanism within.

The dial spring 304 urges the dial teeth 356 into engagement with the locking teeth 388 on the rear surface of the first housing part 306. This inhibits rotation of the dial 302.

Operation of the buckle 122 is best understood in the context of the entire apparatus.

When it is desirable to fasten an occupant into the seat 10, the groin strap 106 and buckle 122 are passed upwards, between the legs to the lap area. The occupant's arms are passed between each of the strap shoulder portions and strap waist portions respectively. It is assumed that the straps 102, 104 are at maximum effective length $ESL_{max}$, i.e. per FIG. 13a.

Figure 23:
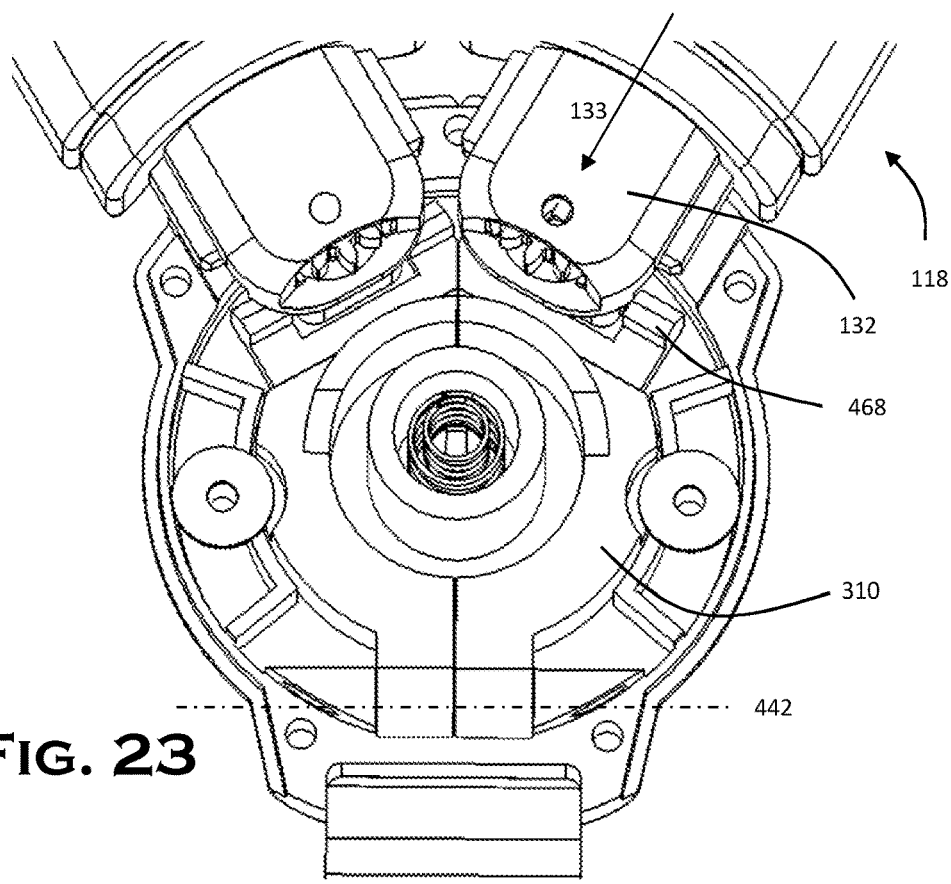
FIG. 23 is a front perspective view of the subassembly of FIG. 14 in a first condition with some parts removed; and, FIG. 24 is a front perspective view of the subassembly of FIG. 14 in a second condition with some parts removed.
Figure 24:
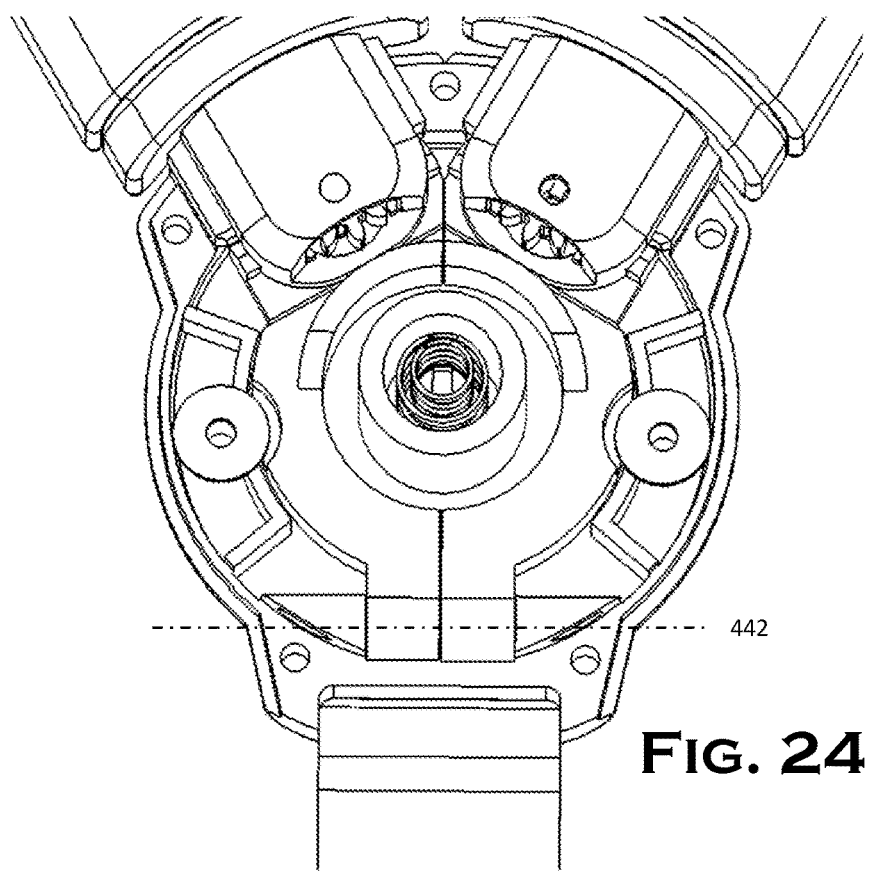

Referring to FIG. 23, the left strap clip assembly 118 is inserted into the left strap clip opening 406 in the first engagement direction 133. As the clip assembly 118 enters the strap clip opening 406 the projecting portion 146 of the engagement member 132 pushes the first clip arm 310 rearwards against the first clip arm spring 314 about the clip arm pivot axis 442. This is because the rear wall 156 of the projecting portion 146 bears against the tabs 468, 470.

As the left strap clip assembly 118 continues in the first engagement direction 133, the tabs 468, 470 encounter the notches 176, 178 and resile into them under the action of the clip arm spring 314. In this engaged position, the tabs 468, 470 bear against the bearing surfaces 180, 182 and inhibit removal of the left strap clip assembly 118. When in this clipped condition, the teeth 206 of the gear 134 engage the teeth 360 of the dial 302.

The same action occurs for the right strap clip assembly. It will be noted that the provision of separately actuable clip arms 310, 312 facilitate clipping of the strap clip assemblies at different times.

In order to shorten the effective strap length ESL of each strap 102, 104 to properly fit the apparatus 100 to the occupant, the dial 302 is pressed rearwardly long the actuation axis 342 towards the second housing part 308. This compresses the dial spring 304 and disengages the locking teeth 356, 388 allowing rotation of the dial 302. Rotation of the dial 302 causes rotation of the gears 134 in each strap clip assembly because they are in mesh (as described above). This rotation simultaneously actuates the strap clip assemblies 118, 120 as described above, thus selective shortening the effective strap length (ESL) to tighten the straps 102, 104. It will be noted that the operator can also length the effective strap lengths by rotating the dial 302 in the opposite direction. Releasing the dial will re-engage the teeth 356, 388 under action of the dial spring 304, thus locking the apparatus 100 in the desired condition.

When the occupant is ready to exit the seat, the button 288 can be depressed. This causes the legs 334, 336, 338, 340 to move downwards. The legs 334, 336, 338, 340 are initially spaced from the actuation members 458 to avoid actuation when the dial is depressed. After this space is traversed, the legs will eventually contact the actuation members 458 of the clip arms 310, 312 to push the clip arms 310, 312 downwards against the bias of the clip arm springs 314, 316. This disengages the tabs 472, 474 from the notches 176, 178 and allows the strap clip assemblies 118, 120 to be removed.

It will be noted that the angle 344 of the legs 334, 336, 338, 340, and the angle 478 of the actuation members 458 is selected such that in all rotation positions of the dial, both the clip arms 310, 312 are depressed simultaneously.

Once the clip arms 310, 312 are removed, the button 288 is released, and resiles under the button spring 298.

It will be noted that the button spring 298 is selected to have a significantly lower spring constant than the dial spring such that depression of the button 288 does not cause depression of the dial 302.

It will be noted that depression of the dial will not cause actuation of the clip arms 310, 312, as the axial length of the outer collar 362 of the dial 302 is selected to "bottom out" on the second housing before the legs of the button reach the actuation members. This is why the legs are spaced apart from the clip arms 310, 312.

Variations

Variations fall within the scope of the present invention.

The above embodiment is described in-situ in a seat. It is envisaged that the system may be provided as a built-in/factory fitted option for products such as strollers, push chairs, strollers etc. Similarly, the present invention may be provided as a retrofit or aftermarket sub-assembly for installation on a suitable seat by a user.

The pulley 144 may be resiliently biased to return to the position in which the ESL is maximum (i.e. the position of FIG. 13a). This may be achieved by installing an elastic member between the upper end of the slide track and the pulley 144.

The dial may be configured to rotate in one direction only. In other words, a ratchet may be provided between the dial 302 and the housing 306, 308. This would allow the apparatus to be tightened but not loosened. Loosening may be achieved by unclipping the strap clip assemblies and manually pulling the straps to slide the pulley 144 to the end of the slide track.

An indicator may be provided on the strap clip assemblies to indicate the position of the pulley (and therefore what level of strap extension is present). This may be in the form of a slot or window in the housing 136 and slide track 138 so that the pulley 144 can be observed. Alternatively, small windows or apertures may be provided at the extremes of pulley travel. The pulley may be coloured e.g. red to indicate its position.

The apparatus may be configured to avoid over-tightening. For example, the dial teeth and gear teeth may be configured to ride over each other at a predetermined torque. This would provide an audible "clicking" to indicate that the torque, and therefore strap tension, was sufficient.

The use of a rotatable dial to adjust the length of the straps is adaptable to other locations. For example, a dial may be provided behind the seat back and configured to shorten each shoulder strap. The dial may be provided to shorten both shoulder and/or waist and/or groin straps behind the seat back.

The above embodiment may be modified to adjust the groin strap as well as the shoulder/waist straps.

The waist straps may be directly attached to the buckle housing (like the groin strap). The free end of the shoulder strap would be attached to the first shafts of the strap clip assemblies such that adjustment of the apparatus adjusted the length of the shoulder straps only. Alternatively, the waist straps may also have strap clip assemblies. The shoulder/waist/groin strap clip assemblies may be geared differently to each other to provide variable adjustment.

Actuation of the embodiment described above is manual. In a further embodiment, adjustment is performed by powered actuators, for example electrically powered actuators such as electric motors. Adjustment may be effected by means of an electronic controller.

The strap clip assembly may be modified to act as a standalone strap adjuster. Instead of passing round the first shaft, the strap may exit where the engagement member is (omitting the engagement member and wire). The pulley may be configured to lock against the slide track 138, for example with a pair of opposed push tabs. Therefore, releasing the pulley and sliding it along the track would adjust the effective length of the strap. Such strap adjusters may be provided instead of, or in addition to, the above-described embodiment of the present invention. Such strap adjusters may provide an additional degree of adjustment.

The above embodiment and present invention is particularly well suited to strollers and push chairs. It will be noted that the present invention, and the above described embodiment is also suitable for installation on prams, buggies, joggers, carrier systems, high chairs, car seats, safety belts, tie down systems, restraint systems and even pet protection.

It is within the scope of the present invention to employ the apparatus on other types of straps or restraints for any type of person, item or article, such as:

Child or adult human occupants (as described above);
Animals/livestock;
Cargo containers;
General packaged and non-packaged goods which may be in transit.

It is also envisaged that the system may be used to adjust a flexible strap or support joining one item to another, or suspending one item from another.

The invention claimed is:

1. A restraint apparatus comprising:
   a restraint having a first strap extending between a first anchor point and a second anchor point, the first strap having an effective length therebetween; and,
   an adjustment apparatus comprising:
      an adjuster comprising:
         a body;
         a movable first member mounted to the body; and,
         a second member mounted to the body;
         the first strap entering the body at a first position, looping around the first member, extending to and looping around the second member, and exiting the body at a second position spaced apart from the first position, such that the first strap forms an "S" shape;
         such that movement of the moveable first member relative to the second member changes the effective length of the first strap between the first anchor point and the second anchor point and,
      an actuation assembly comprising a body and a rotatable control;
   wherein rotation of the rotatable control relative to the body moves the movable first member to shorten the effective length of the first strap to tighten the restraint.

2. A restraint apparatus according to claim 1, in which the restraint comprises a second strap extending between a third anchor point and a fourth anchor point and having an effective length therebetween, in which rotation of the rotatable control shortens the effective length of the second strap simultaneously with the first strap.

3. A restraint apparatus according to claim 2, in which the first and second straps each comprise shoulder strap portions connectable to the first anchor point and the third anchor point, respectively.

4. A restraint apparatus according to claim 3, in which the first and second straps each comprise waist strap portions connected to the shoulder strap portions, in which each of the waist strap portions is connectable to the second anchor point and the fourth anchor point, respectively.

5. A restraint apparatus according to claim 1, in which the restraint comprises a third strap connected to the actuation assembly, wherein the third strap comprises a groin strap portion.

6. A restraint apparatus according to claim 1, in which rotation of the rotatable member causes a flexible tension member to be wound around a shaft, in which the flexible tension member is connected to the moveable first member.

7. A restraint apparatus according to claim 6, wherein the flexible tension member is a wire.

8. A restraint apparatus according to claim 6, in which the adjuster comprises the flexible tension member and shaft.

9. A restraint apparatus according to claim 8, comprising a drive formation between the rotatable member and the shaft.

10. A restraint apparatus according to claim 9, in which the drive formation is a gear train.

11. A restraint apparatus according to claim 10, in which the gear train comprises a first gear tooth on the rotatable member, and a second gear tooth on the shaft, the first and second gear teeth being in mesh.

12. A restraint apparatus according to claim 11, in which attachment of the adjuster to the actuation assembly places the first and second gear teeth being into mesh.

13. A restraint apparatus according to claim 12, in which the adjuster can be released from the actuation assembly by activation of a user control.

14. A restraint apparatus according to claim 13, in which the user control is a button on the actuation assembly.

15. A restraint apparatus according to claim 14, in which the rotatable member is a dial, and the button is positioned in the centre of the dial.

16. A restraint apparatus according to claim 1, in which the adjuster is selectively attachable to the actuation assembly.

17. A restraint apparatus according to claim 16, in which the adjuster comprises an engagement member for engagement with the actuation assembly, and a slide track for linear movement of the first member, in which the engagement member and slide track are moveably mounted to each other.

18. A restraint apparatus according to claim 17, in which the engagement member and slide track are pivotably moveable.

* * * * *